(12) United States Patent
Hong et al.

(10) Patent No.: US 8,290,931 B2
(45) Date of Patent: Oct. 16, 2012

(54) DATABASE DESIGNER

(75) Inventors: Mingsheng Hong, North Billerica, MA (US); Priya Arun, Nashua, NH (US); Chang-Jian Sun, Nashua, NH (US); Shilpa Lawande, Littleton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 12/816,770

(22) Filed: Jun. 16, 2010

(65) Prior Publication Data

US 2011/0213766 A1 Sep. 1, 2011

Related U.S. Application Data

(60) Provisional application No. 61/306,877, filed on Feb. 22, 2010.

(51) Int. Cl.
*G06F 7/00* (2006.01)
*G06F 17/30* (2006.01)

(52) U.S. Cl. ........................................................ 707/713

(58) Field of Classification Search ........................ None
See application file for complete search history.

(56) References Cited

U.S. PATENT DOCUMENTS

| | | | |
|---|---|---|---|
| 5,345,585 A | 9/1994 | Iyer et al. | |
| 5,423,037 A | 6/1995 | Hvasshovd | |
| 5,794,228 A | 8/1998 | French et al. | |
| 5,794,229 A | 8/1998 | French et al. | |
| 5,878,409 A | 3/1999 | Baru et al. | |
| 5,918,225 A | 6/1999 | White et al. | |
| 5,960,423 A | 9/1999 | Chaudhuri et al. | |
| 6,009,432 A | 12/1999 | Tarin | |
| 6,029,163 A | 2/2000 | Ziauddin | |
| 6,105,020 A | 8/2000 | Lindsay et al. | |
| 6,421,687 B1 | 7/2002 | Klostermann | |
| 6,801,903 B2 | 10/2004 | Brown et al. | |
| 6,879,984 B2 | 4/2005 | Duddleson et al. | |
| 7,024,414 B2 | 4/2006 | Sah et al. | |
| 7,139,783 B2 | 11/2006 | Hinshaw et al. | |
| 7,464,247 B2 | 12/2008 | Uppala | |
| 7,483,918 B2 | 1/2009 | Chaudhuri et al. | |
| 2004/0260684 A1 | 12/2004 | Agrawal et al. | |
| 2005/0065939 A1 | 3/2005 | Miao | |
| 2005/0187917 A1 | 8/2005 | Lawande et al. | |
| 2005/0187977 A1 | 8/2005 | Frost | |
| 2005/0203940 A1 | 9/2005 | Farrar et al. | |

(Continued)

FOREIGN PATENT DOCUMENTS

WO WO2008016877 2/2008

OTHER PUBLICATIONS

Ilyas et al, A survey of Top-k Query Processing Techinques in Relational Database Systems Oct. 2008, ACM Computing Surveys, vol. 40 No. 4 Article 11, 11:1-58.*

(Continued)

*Primary Examiner* — Pierre Vital
*Assistant Examiner* — Jason Liao

(57) ABSTRACT

Methods, systems, and apparatus, including computer programs encoded on a computer storage medium, for a database designer and a database storage designer. In one aspect, a method includes creating a set of candidate projections and progressively narrowing the set of candidate projections and a set of queries by eliminating candidate projections that do not satisfy a performance improvement criterion for remaining queries based on the properties associated with the candidate projections.

38 Claims, 6 Drawing Sheets

U.S. PATENT DOCUMENTS

| | | |
|---|---|---|
| 2005/0283658 A1 | 12/2005 | Clark et al. |
| 2006/0085484 A1 | 4/2006 | Raizman et al. |
| 2006/0184338 A1 | 8/2006 | Lightstone et al. |
| 2006/0253473 A1 | 11/2006 | Agrawal et al. |
| 2006/0282423 A1 | 12/2006 | Al-Omari et al. |
| 2007/0027904 A1 | 2/2007 | Chow et al. |
| 2007/0067261 A1 | 3/2007 | Burger et al. |
| 2008/0033914 A1 | 2/2008 | Cherniack et al. |
| 2008/0281784 A1 | 11/2008 | Zane et al. |

OTHER PUBLICATIONS

Steinbrunn et al., "Heuristic and Randomized Optimization for the Join Ordering Problem," VLDB Journal, Spring Verlag, Berlin, DE LINKD—DOI: 10.1007/500778005040, vol. 6, No. 3, Aug. 1, 1997, pp. 191-208, XP000957755, ISSN: 1066-8888, the whole document.

International Search Report and Written Opinion for PCT Application No. PCT/US2010/023216, dated Aug. 3, 2010, 16 pages.

Supplementary European Search Report for EP Application No. EP 07799914, dated May 28, 2010, 4 pages.

Abadi, et al., "Integrating Compression and Execution in Column-Oriented Database Systems"., Jun. 27, 2006, Jun. 27-29, 2006, Chicago, Illinois, USA.

Agrawal, et al., "Database Tuning Advisor for Microsoft SQL Server 2005", Proceedings of the 30th VLDB Conference, Toronto, Canada, Jan. 1, 2004.

Bruno, et al., "Constrained Physical Design Tuning"., The VLBD Journal., The International Journal on Very Large Data Bases, vol. 19., No. 1., Jul. 15, 2009.

Papadomanolakis, et al., "Efficient Use of the Query Optimizer for Automated Physical Design"., VLDB '07, Sep. 23-28, 2007., $33^{rd}$ VLDB Journal., The International Journal on Very Large Data Bases., Vienna, Austria.

Stavros, Harizopoulos, et al., "Performance Tradeoffs in Read-Optimized Databases"., Proceedings of the International Conference on Very Large Data Bases., VLDB Conference, Rome, Italy, Sep. 11-14, 2001., Morgan Kaufman, Orlando, FLA., Sep. 12, 2006., pp. 487-496.

Vertica Systems Inc., "The Vertica Analytic Overview White Paper", [Online] Nov. 2008, pp. 1-13, Retrieved from the Internet: URL:http://www.acctiva.co.uk/userfiles/fileVerticaArchitectureWhitePaper.pdf [retrieved on Sep. 19, 2010].

Communication Relating to the Results of the Partial International Search for PCT Application No. PCT/US2010/041898, dated Oct. 13, 2010, 8 pages.

"IBM Universal Database for Linux, Unix, and Windows," Product Manual, Verison 7, 68 pages, http://www-306.ibm.com/software/data/db2/udb/support/manualsv7.html.

"IBM Universal Database for Linux, Unix, and Windows," Product Manual, Version 7.2, 94 pages, http://www-306.ibm.com/software/data/db2/udb/support/manualsv7.html.

"ADABAS-RAPID Demostration Databases, " Statistics Canada, Demonstration Databases, Jun. 1978, 38 pages.

"An Introduction to Multidimensional Database Technology," Kenan Systems Corporation, 1993-1995, 29 pages.

"RAPID Database Creation," Statistics Canada, 1978, 76 pages.

"Rapid Database Retrieval Manual," Statistics Canada, 1978, 46 pages.

"RAPID DBMS Manual," Statistics Canada, 1978, 16 pages.

"RAPID File Design Manual," Statistics Canada, 1978, 56 pages.

"RAPID Language Reference," Statistics Canada, 1978, 134 pages.

"RAPID Programmers Guide," Statistics Canada, 1978, 100 pages.

Abadi et al., "Column-Stores vs. Row-Stores: How Different Are They Really?" SIGMOD '08, Jun. 9-12, 2008, Vancouver, British Columbia, 14 pages.

Abadi et al., "Materialization Strategies in a Column-Oriented DBMS," Proceedings of ICDE, 2007, Istanbul, Turkey, 10 pages.

Abadi, Daniel, "A Tour Through Hybrid Column/row-Oriented DBMS Schemes," [online], [retrieved Sep. 9, 2009]. Retrieved from Internet: <URL: http://dbmsmusings.blogspot.com/2009/09/tour-through-hybrid-columnrow-oriented.html>, 10 pages.

Abadi, Daniel, "Redefining Physical Data Independence," Proceedings of CIDR, Jan. 2007, 6 pages.

Abadi, Daniel, "Watch Out for VectorWise," [online], [retrieved Sep. 9, 2009]. Retrieved from Internet: <URL: http://dbmsmusings.blogspot.com/2009/07/watch-out-for-vectorwise.html>, 9 pages.

Agrawal et al., "Automated Selection of Materialized Views and Indexes for SQL Databases," Proceedings of the 26th International Conference on Very Large Databases, Cairo, Egypt, 2000, pp. 496-505.

Agrawal et al., "Integrating Vertical and Horizontal Partitioning into Automated Physical Database Design," SIGMOD, Jun. 13, 2004, 12 pages.

Ailamaki et al., "Weaving Relations for Cache Performance," Proceedings of the 27th VLDB Conference, Roma, Italy, 2001, 12 pages.

Alsberg, Peter A. ,"Space and Time Savings Through Large Data Base Compression and Dynamic Restructuring," Proceedings of the IEEE vol. 63, No. 8, Aug. 1975, 9 pages.

Andersson, "A Study of Modified Interpolation Search in Compressed, Fully Transposed, Ordered Files," Proceedings of the 4th International Conference on Statistical and Scientific Database Management, 1988, 13 pages.

Apache Cassandra "Data Model" [online], [retrieved on May 29, 2009]. Retrieved from the Internet <URL: http://cwiki.apache.org/confluence/display/CSDR/Pata+Model >, 2 pages.

Baker, Margaret, "User's Guide to the Berkeley Transposed File Statistical System," Survey Research Center Technical Report Number One, Jan. 1974, 132 pages.

Bleier et al., "File Organization in the SDC Time-Shared Data Management System (TSMS)," North-Holland Publishing Company, 1969, 8 pages.

Boncz et al., "MonetDB/X100: Hyper-Pipelining Query Execution," Proceedings of the 2005 CIDR Conference, 13 pages.

Boral et al., "Prototyping Bubba, A Highly Parallel Database System," IEEE Trans. on Knowledge and Data Engineering, Mar. 1990, 21 pages.

Brun et al., "Visualization of Scientific Data for High Energy Physics. PAW++, KUIP, PIAF: General-Purpose Portable Software Tools for Data Analysis and Presentation," European Organization for Nuclear Research, 1993, 12 pages.

Burnett et al., "Data Management Support for Statistical Data Editing and Subset Selection," Proceedings of the 1st LBL Workshop on Statistical Database Management, 1981, 15 pages.

Chaudhuri et al., "An Efficient Cost-Driven Index Selection Tool for Microsoft SQL Server," Proceedings of the 23rd VLDB Conference Athens, Greece, 1997, pp. 146-155.

Cochinwala et al., "A Multidatabase System for Tracking and Retrieval of Financial Data," Proceedings of the 20th VLDB Conference Santiago, Chile, 1994, 8 pages.

Cohen et al., MAD Skills: New Analysis Practices for Big Data [online], [retrieved May 29, 2009]. Retrieved from the Internet <URL: http://db.cs.berkeley.edu/papers/vldb09-madskills.pdf>, 12 pages.

Cornell et al., "An Effective Approach to Vertical Partitioning for Physical Design of Relational Databases," IEEE Transactions on Software Engineering, vol. 16, No, 2, Feb. 1990, 11 pages.

Cornell, "A Vertical Partitioning for Relational Databases," IBM Thomas J. Watson Research Center, 1987, 8 pages.

Cressman, "Analysis of Data Compression in the DLT2000 Tape Drive," Digital Technical Journal vol. 6, No. 2, 1994, 17 pages.

Cudre-Mauroux et al., "The Case for RodentStore, an Adaptive, Declarative Storage System," 4th Biennial Conference on Innovative Data Systems Research (CIDR), Jan. 4-7, 2009, Asilomar, California, 7 pages.

Date, C. J., "An Introduction to Database Systems, vol. 1," Addison-Wesley Publishing Company, 1990, 400 pages.

DBMS2—"Pax Analytica? Row- and Column-Stores Begin to Come Together," [online], (retrieved o Sep. 9, 2009). Retrieved from Internet: <URL: http://www.dbms2.com/2009/08/04/pax-analytica-row-and-column-stores-begin-to-come-together/>, 7 pages.

DBMS2—The secret sauce to Clearpace's compression [online], [retrieved May 29, 2009]. Retrieved from the Internet <URL: http://www.dbms2.com/2009/05/14/the-secret-sauce-to-clearpaces-compression/>, 6 pages.

Elmasri et al., "Fundamentals of Database Systems." The Benjamin/Cummings Publishing Company, Inc., 1989.
Farsi et al., "A Relational Database for Efficient Processing of Statistical Queries," Proceedings of the Second International Workshop on Statistical Database Management, 1983, 9 pages.
Galindo-Legaria, Cesar A. et al. "Outerjoin Simplification and Reordering for Query Optimization," ACM Trans. Database Syst. 22(1) pp. 43-73 (1997).
Goil et al., "Sparse Data Storage of Multi-Dimensional Data for OLAP and Data Mining, "Department of Electrical & Computer Engineering Center for Parallel and Distributed Computing, 1994, 26 pages.
Goldstein, Andrew C. "Files-11 On-Disk Structure Specification," Digital Equipment Corporation, Jan. 15, 1979, 104 pages.
Greenplum—Greenplum Database 3.3—Features [online], [retrieved Jul. 13, 2009]. Retrieved from the Internet <URL: http://www.greenplum.com/products/features/>, 6 pages.
Gupta et al., "Selection of Views to Materialize under a Maintenance-Time Constraint," International Conference on Database Theory (ICDT), 1999, 453-470.
Hammer et al., "A Heuristic Approach to Attribute Partitioning," Laboratory for Computer Science, 1979, 9 pages.
Hankins et al., "Data Morphing: An Adaptive, Cache-Conscious Storage Technique," Proceedings of the 29th VLDB Conference, Berlin, Germany, 2003, 12 pages.
Hawthorn, Paula, "Microprocessor Assisted Tuple Access, Decompression and Assembly for Statistical Database Systems," Proceedings of the 8th VLDB, 1982, pp. 223-233.
Howard, Philip, "The optimal warehouse," [online], (retrieved on Sep. 9, 2009]. Retrieved from Internet: <URL: http://www.it-director.com/technology/data_magmt/content.php?cid-11453 >, 2 pages.
Inmon et al., "The Dynamics of Data Base," Prentice Hall, 1986.
International Preliminary Report on Patentability for PCT Application No. PCT/US07/74740, dated Feb. 12, 2009, 16 pages.
International Preliminary Report on Patentability for PCT Application No. PCT/US07/74741, dated Feb. 12, 2009, 5 pages.
International Search Report and Written Opinion for PCT Application No. PCT/US07/74740, dated Jul. 3, 2008, 19 pages.
International Search Report and Written Opinion for PCT Application No. PCT/US07/74741, dated Jul. 24, 2008, 10 pages.
Ioannidis et al., "Left-Deep vs. Bushy Trees: An Analysis of Strategy Space and ITS Implications for Query Optimization," Computer Sciences Department, University of Wisconsin, Madison, WI, 1991, pp. 168-177.
Khoshafian et al., "A Query Processing Strategy for the Decomposed Storage Model," Microelectronics and Computer Technology Corporation, 1987, pp. 636-643.
Khoshafian et al., "Efficient Support of Statistical Operations," IEEE Trans. on Software Engineering, vol. SE-11, No. 10, Oct. 1985, 13 pages.
Kickfire "The First Analytic Appliance for the Mass Market, Blog comment," [online], (retrieved on Aug. 6, 2009). Retrieved from the Internet: <URL: http://www.kickfire.com/blog/?p-392>, 4 pages.
Korth et al., "Database System Concepts," Second Edition, McGraw-Hill, Inc., 1991.
March, "On the Selection of Efficient Record Segmentations and Backup Strategies for Large Shared Databases," ACM Transactions on Database Systems, vol. 9, No. 3, Sep. 1984, 30 pages.
McCarthy, J. L., "Enhancements to the Codata Data Definition Language," Feb. 1982.
McKusick et al., "A Fast File system for UNIX," Computer ACM Transactions on Computer Systems 2, 3 (Aug. 1984), pp. 181-197.
Muthuraj et al., "A Formal Approach to the Vertical Partitioning Problem in Distributed Database Design," CIS Department University of Florida and College of Computing Georgia, a Technical paper, 1992, 24 pages.
Naeker, Philip A. H. "Real-World Interoperability", Part 4, RDBMS Maturity, vol. 10, No. 12, Nov. 1991, 8 pages.
Navathe et al., "Vertical Partitioning Algorithms for Database Design," ACM Transactions on Database Systems, vol. 9, No. 4, Dec. 1984, 31 pages.
Navathe, et al., "Vertical Partitioning for Database Design: A Graphical Algorithm," Database Systems Research and Development Center, 1989, 11 pages.
O'Neil, Patrick E., "Model 204 Architecture and Performance," Presented at 2nd International Workshop on High Performance Transaction Systems, Sep. 1987, 21 pages.
Ono et al., "Measuring the Complexity of Join Enumeration in Query Optimization," Proceedings of the 16th VLDB Conference, Brisbane, Australia, Aug. 13-16, 1990), pp. 314-325.
Papadomanolakis et al., "AutoPart: Automating Schema Design for Large Scientific Databases Using Data Partitioning," Proc. 16th International Conference on Scientific and Statistical Database Management (SSDBM 2004), Santorini Island, Greece, Jun. 2004, 10 pages.
Pellenkoft et al., "The Complexity of Transformation-Based Join Enumeration," Proceedings of the 23rd VLDB Conference, Athens, Greece, 1997, pp. 306-315.
Pirahesh, Hamid et al. "Extensible/Rule Based Query Rewrite Optimization in Starburst," IBM Almaden Research Center, San Jose, CA, pp. 39-48.
Richardson, "Supporting Lists in a Data Model (A Timely Approach)," Proceedings of the 18th VLBD Conference Vancouver, British Columbia, Canada, 1992, 12 pages.
Schaffner et al., "A Hybrid Row-column OLTP Database Architecture for Operational Reporting" [online], [retrieved on May 29, 2009]. Retrieved from the Internet <URL: http://www.vldb.org/conf/2008/workshops/WProc_BIRTE/p7-schaffner.pdf>, 14 pages.
Schek, Hans-Joerg, "Information Retrieval with APL by Adaptive Index and User Guidance," Information Retrieval with APL, 1980, 8 pages.
Schemas Modeling Techniques, Oracle Database Data Warehousing Guide, 2001, 24 pages.
Schemas, Oracle8i Data Warehousing Guide, 1999, 7 pages.
Selinger et al., "Access Path Selection in a Relational Database Management System," IBM's System R Optimizer, Proceedings of the ACM SIGMOD Conference on the Management of Data, Boston, MA, May, 1979), pp. 23-34.
Seshadri et al., "Sequence Query Processing," SIGMOD 94, ACM, pp. 430-441.
Shao et al., "Clotho: Decoupling Memory Page Layout from Storage Organization," Carnegie Mellon University, Proceedings of the 30th VLDB Conference, Toronto, Canada, 2004, 12 pages.
Shasha, Dennis E. "Database Tuning," Prentice Hall PTR, 1992.
Shoshani et al., "Statistical Databases: Characteristics, Problems, and Some Solutions," Proceedings of the Eighth International Conference on Very Large Data Bases, Sep. 1982, 12 pages.
Son J.H. et al.: "An Adaptable Vertical Partitioning Method in Distributed Systems", Journal of Systems and Software, Elsevier North Holland, New York, NY, US LNKD-DOI: 10.1016/J.JSS.2003.04.002, vol. 73, No. 3, Nov. 1, 2004, pp. 551-561, XP004560798 ISSN: 0164-1212, 11 pages.
Stonebraker et al., "C-Store: A Column-Oriented DBMS," Proc. 31st VLDB Conference, Trodheim, Norway, 2005, 12 pages.
Stonebraker, Michael, Readings in Database Systems, Second Edition, Morgan Kaufmann, 1994.
Tanaka, "A Data-stream Database Machine with Large Capacity," Advanced Database Machine Architecture, 1983, 37 pages.
Tao et al., "Optimizing Large Star-Schema Queries with Snowflakes via Heuristic-Based Query Rewriting," IBM Canada Ltd., 2003, pp. 1-15.
Thomas et al., "ALDS Project: Motivation, Statistical Database Management Issues, Perspectives, and Directions," Proceedings of the 2nd International Workshop on Statistical Database Management, 1983, 7 pages.
Tian-Lei et al., "Automatic Relational Database Compression Scheme Design Based on Swarm Evolution," Journal of Zhejiang University, published Apr. 5, 2006, pp. 1642-1651.
Townsend et al., "Lowering Your IT Costs with Oracle Database 11g Release 2," An Oracle Corporation White Paper, Sep. 2009, 23 pages.
Tsuda et al., "Transposition of Large Tabular Data Structures with Applications to Physical Database Organization—Part I. Transposition of Tabular Data Structures and Part II. Applications to Physical Database Organization," ACTA Information, vol. 19, 1983, 41 pages.

Turner et al., "A DBMS for Large Statistical Databases," Statistics Canada, 1979, pp. 319-327.

Uno, Takeaki "An Algorithm for Enumerating all Directed Spanning Trees in a Directed Graph," In Proceedings of the 7th International Symposium on Algorithms and Computation, Lecture Notes in Computer Science; vol. 1178, 1996, pp. 166-173.

Valentin et al., "DB2 Advisor: An Optimizer Smart Enough to Recommend Its own Indexes," Proc. ICDE Conf., 2000, pp. 101-110.

Vance et al., "Rapid Bush Join-Order Optimization with Cartesian Products," Proceedings of the 1996 ACM SIGMOD International Conference on Management of Data, Montreal, Quebec, Canada, Jun. 4-6, 1996), pp. 35-46.

Weeks et al., "Flexible Techniques for Storage and Analysis of Large Continuous Surveys," Proceedings of the First LBL Workshop on Statistical Database Management, Mar. 1982.

Wiederhold, Gio, "Database Design," McGraw-Hill Book Company, 1983.

Wong et al., "Bit Transposed Files," Proceedings of VLDB 85, Stockholm, 1985, 10 pages.

Zhou et al., A Multi-resolution Block Storage Model for Database Design, Proceedings of the Seventh International Database Engineering and Applications Symposium (IDEAS '03), 4 pages.

Zilio et al., DB2 Design Advisor; Integrated Automatic Physical Database Design, Proc. 30th VLDB Conference, Toronto, Canada, Sep. 2004, p. 1087-1097.

Zukowski et al., DSM vs. NSM : CPU Performance Tradeoffs in Block-Oriented Query Processing, Proceedings of the Fourth International Workshop on Data Management on New Hardware, Jun. 13, 2008, Vancouver, Canada, 8 pages.

Baralis, et al. "Materialized View Selection in a Multidimensional Database" in Proceedings of the 23rd VLDB Conference, Athens, Greece, 1997, pp. 156-165.

Batory, D.S., "On searching Transposed Files," ACM Transactions on Database Systems, vol. 4, No. 4 Dec. 1979, 14 pages.

\* cited by examiner

DATABASE DESIGNER

CROSS-REFERENCE TO RELATED APPLICATIONS

This application claims the benefit under 35 U.S.C. §119(e) of U.S. Provisional Application No. 61/306,877, filed Feb. 22, 2010, the entire contents of which is incorporated herein by reference.

BACKGROUND

This specification relates to database design.

Structured query language (SQL) is a computer language based on relational algebra that is used for querying and managing data in relational database management systems. A relational database management system (RDBMS) is a database system based on a relational model where data is organized into tables and relationships among tables are maintained. Data in a RDBMS can be compressed to reduce its storage space. Database design is typically a process of determining a physical model for data in a database in order to improve the performance of the database.

SUMMARY

In general, one innovative aspect of the subject matter described in this specification can be embodied in methods that include the actions of creating a set of candidate projections each being based on a column sort order in a set of column sort orders and being associated with properties of one or more tables in a set of tables to which the column sort order applies, wherein a column sort order is a sequence of one or more columns, each column's data being stored in an order; and until a stopping condition is reached, progressively narrowing the set of candidate projections and a set of queries by eliminating candidate projections that do not satisfy a performance improvement criterion for remaining queries based on the properties associated with the candidate projections. Other implementations of this aspect include corresponding systems, apparatus, and computer programs, configured to perform the actions of the methods, encoded on computer storage devices.

These and other implementations can each optionally include one or more of the following features. Narrowing the set of queries further comprises eliminating queries from the set of queries that are sufficiently optimized by the remaining candidate projections. One or more of the candidate projections in the set of candidate projections is each associated with segmentation information that describes how data of the candidate projection would be stored across a plurality of nodes. The segmentation information specifies a set of one or more high number of distinct value columns in the candidate projection to be used for distributing the data across the nodes. Progressively narrowing further comprises removing tables, from the set of tables, that have candidate projections in the set of candidate projections, that are no longer referenced by remaining queries in the set of queries. The stopping condition is reached when the set of tables is empty, when the set of queries is empty, or when a number of queries in the set of queries is beyond a threshold.

These and other implementations can each optionally include one or more of the following features. Progressively narrowing further comprises removing tables from the set of tables that have a number of candidate projections, in the set of candidate projections, that has reached a target number of projections. The target number of projections is determined by a design policy. The design policy favors query performance, load performance, or a balance between query and load performance. The balance is achieved by increasing a number of projections in the candidate set of projections until query optimization is no longer benefited. Query optimization is no longer benefited when a percentage of queries in the set of queries that have been optimized is beyond a threshold. The target number of projections allows for up to K node failures. Eliminating candidate projections comprises generating an execution plan for each of one or more remaining queries in the set of queries wherein each execution plan is based on one or more of the remaining candidate projections. For each execution plan, associating a benefit value with each candidate projection used by the execution plan wherein the benefit value is based on a contribution the candidate projection makes towards optimizing the execution plan; and eliminating candidate projections from the set of candidate projections that do not satisfy the performance improvement criterion based on respective benefit values associated with the candidate projections.

These and other implementations can each optionally include one or more of the following features. The benefit value associated with each candidate projection is determined based on whether the candidate projection's columns are used in any of the execution plan's highlights. A plan highlight is a run-length encoding on a predicate evaluation, on a grouping and aggregate keys, or on join keys on a foreign key side of a foreign key/primary key join. A plan highlight is a sort-based optimization on a value index on a predicate evaluation, on a group-by pipeline, on a merge join, on a order-by sort elimination, or on an analytics sort elimination. A plan highlight is a fully distributed group-by or an identically segmented projection join. The properties of a table in the set of tables are statistical properties and include a number of rows in a column of the table, a number of unique values in a column of the table, or both. Eliminating queries comprises: generating an execution plan for each of one or more remaining queries in the set of queries wherein each execution plan is based on one or more of the remaining candidate projections; determining a difference in a level of optimization of each execution plan between the execution plan as optimized by the set of candidate projections before a most recent narrowing of the set of candidate projections and the execution plan as optimized after the most recent narrowing of the set of candidate projections; determining for each query whether the query is sufficiently optimized based on the determined difference in the level of optimization; and eliminating queries from the set of queries that are sufficiently optimized.

These and other implementations can each optionally include one or more of the following features. Creating the set of candidate projections further comprises: generating seeds and extenders based on structural properties of queries in the set of queries; creating a set of column sort orders from the seeds and extenders; adding segmentation column sort orders to the set of column sort orders; and creating the set of candidate projections from the set of column sort orders. The structural properties include one or more columns relied on by the set of queries and wherein a column in the one or more columns is a predicate column, a group-by column, an order-by column, a join column, or an analytics column. One or more candidate projections in the set of candidate projections satisfy an override. Override specifies a sort order, an encoding, or segmentation properties of a candidate projection. The override requires that column sort orders for a table in the set of tables begin with a specific column, the method further comprising eliminating column sort orders for the table that do not begin with the specific column. The override requires that column sort orders for a table in the set of tables have one or more columns with respective encodings, the method further comprising eliminating column sort orders for the table that do not have the one or more columns with the respective encodings.

These and other implementations can each optionally include one or more of the following features. The override requires that column sort orders for a table in the set of tables be segmented by a column of the table, the method further comprising eliminating extended column sort orders for the table that are not segmented on the column. Generating seeds and extenders further comprises: if the column is a predicate column and a number of run-length encoding buckets defined by sorting and run-length encoding the column does not exceed a threshold, generating a seed equal to the column and an extender equal to the column. Generating seeds and extenders further comprises: if the column is in a set of group-by columns for a query in the set of queries, generating a seed equal to the set of group-by columns. Generating seeds and extenders further comprises: if the column is in a set of group-by columns and a number of run-length encoding buckets defined by sorting and run-length encoding the column does not exceed a threshold, generating an extender equal to the set of group-by columns. Creating column sort orders from the seeds and extenders further comprises applying the extenders to the seeds and to results of applying the extenders to the seeds until no additional column sort orders can be generated.

These and other implementations can each optionally include one or more of the following features. For each of one or more of the remaining candidate projections that are not segmented, segmenting the candidate projection on one or more primary key columns of a table corresponding to the candidate projection or segmenting the candidate projection on a column that has a highest number of distinct values. For each of one or more of the remaining candidate projections that are not segmented, if there is a functional dependency between a first column and a second column in the candidate projection, specifying that the candidate projection is sorted and run-length encoded on the first and second columns. For each of one or more of the remaining candidate projections that are not segmented, performing one or more encoding experiments to determine an encoding scheme that yields optimal storage compression. Creating the set of candidate projections and narrowing the set of candidate projections is performed by a relational database management system (RDBMS). The RDBMS is a row-oriented database, a column-oriented database, or a hybrid row and column-oriented database.

In general, another innovative aspect of the subject matter described in this specification can be embodied in system that includes a sort order generator configured to create a set of column sort orders derived from a set of queries, wherein a column sort order is a sequence of one or more columns, each column's data being stored in an order; a projection generator configured create a set of candidate projections, each being based on a column sort order in the set of column sort orders and being associated with properties of one or more tables in a set of tables to which the column sort order applies; and a candidate projection filter configured to filter one or more candidate projections from the set of candidate projections that do not satisfy a performance improvement criterion for the set of queries. Other implementations of this aspect include corresponding methods, apparatus, and computer programs, configured to perform the actions of the methods, encoded on computer storage devices.

These and other implementations can each optionally include one or more of the following features. A query filter configured to filter one or more queries from the set of queries that are sufficiently optimized by candidate projections in the set of candidate projections. A table filter configured to filter one or more tables from the set of tables that have a number of candidate projections in the set of candidate projections that has reached a target number of projections.

In general, another innovative aspect of the subject matter described in this specification can be embodied in methods that include the actions of segmenting a projection that includes a subset of a table's columns in a sort order; adding to the sort order, one or more first columns of the table that are functionally depended on by one or more of the projection's columns; appending to the sort order, one or more second columns of the table that functionally depend on one or more of the column's projections; and determining encoding schemes that improve storage compression for one or more columns of the projection. Other implementations of this aspect include corresponding systems, apparatus, and computer programs, configured to perform the actions of the methods, encoded on computer storage devices.

These and other implementations can each optionally include one or more of the following features. Segmenting comprises segmenting the projection on one or more primary key columns of the table. Segmenting comprises segmenting the projection on a column of the table having a highest number of distinct values. Segmenting results in the projection's data being substantially evenly distributed across nodes. Adding the first columns to the projection comprises run-length encoding the first columns. Appending the second columns to the sort order comprises run-length encoding the second columns. Appending to the sort order to the one or more second columns comprises determining that a relationship of a number of run-length encoding buckets associated with the projection to a number of rows in the table is within a threshold. The first table columns are sort optional, the first table columns are prepended to the sort order. Appending to the sort order one or more high number of distinct value columns from the table that are not run-length encoded.

These and other implementations can each optionally include one or more of the following features. A first column A functionally depends on a second column B, if it holds true that given any two tuples r1 and r2, if r1.A=r2.A, then r1.B=r2.B. Determining the encoding scheme for the one or more columns comprises creating a new projection that includes all of the projection's encoded columns and one or more versions of each non-encoded column of the projection encoded according to a respective encoding scheme. Populating the new projection with data from the table. The data is a random sampling of rows in the table that respects the table's row ordering. The data is not stored in an intermediate table before populating the new projection. Determining which column versions require the least amount of storage for the data.

In general, another innovative aspect of the subject matter described in this specification can be embodied in a system that includes a segmentor configured to segment a projection that includes a subset of a table's columns in a sort order; a first functional dependency modifier configured to add to the sort order, one or more first columns of the table that are functionally depended on by one or more of the projection's columns; a second functional dependency modifier configured to append to the sort order, one or more second columns of the table that functionally depend on one or more of the column's projections; and an encoding experimentation component configured to determine encoding schemes that improve storage compression for one or more columns of the projection. Other embodiments of this aspect include corresponding methods, apparatus, and computer programs, configured to perform the actions of the methods, encoded on computer storage devices.

These and other embodiments can each optionally include one or more of the following features. The segmentor is further configured to perform operations comprising segmenting the projection on one or more primary key columns of the table. The segmentor is further configured to perform operations comprising segmenting the projection on a column of the table having a highest number of distinct values. Segmenting results in the projection's data being substantially evenly distributed across nodes. Adding the first columns to the projection comprises run-length encoding the first columns. Appending the second columns to the sort order comprises run-length encoding the second columns. Appending the sort order to the one or more second columns comprises determining that a relationship of a number of run-length encoding buckets associated with the projection to a number of rows in the table is within a threshold. The first table columns are sort optional, the first table columns are prepended to the sort order. A component configured to append to the sort order one or more high number of distinct value columns from the table that are not run-length encoded. A first column A functionally depends on a second column B, if it holds true that given any two tuples r1 and r2, if r1.A=r2.A, then r1.B=r2.B. Encoding experimentation component is further configured to determine which column versions require the least amount of storage for the data.

Particular implementations of the subject matter described in this specification can be implemented so as to realize one or more of the following advantages. Given input consisting of a query set, a database schema (i.e., a set of tables) and sample data for the tables in the schema, the system can produce a projection design that optimizes query performance, data storage requirements, or both. The system can use a common cost model for evaluating both query execution plans and candidate projections. User-specified overrides can be provided to the system. The system can support properties such as a list of sort columns on which a group-by operation can be evaluated with group-by pipeline. These properties can serve as a means to prune away projections that are not optimized for answering queries. Exploration of the candidate projection search space can be made more efficient by using a compact data structure to represent a class of projection candidates. Statistical information regarding data in design tables (e.g., expected number of rows in the table, the cardinality of table columns, functional dependencies) can be used to provide input to aid in designing candidate projections.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
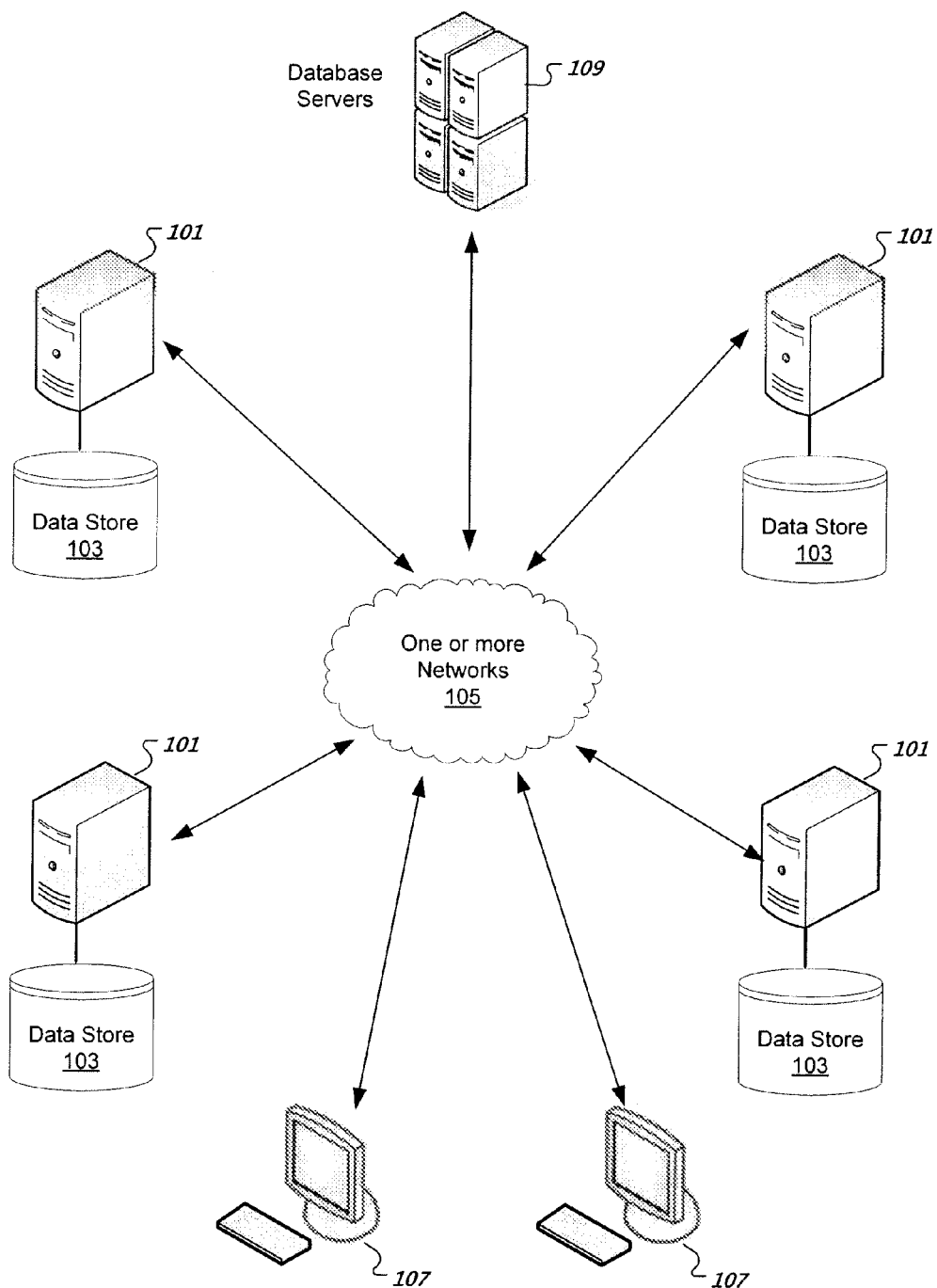
FIG. 1A is a schematic diagram of an example RDMBS.

FIG. 1A is a schematic diagram of an example RDMBS. The RDMBS includes one or more database servers 109 (e.g., data processing apparatuses) accessible through one or more computer networks 105 for optimizing database queries, producing query execution plans, archiving database transactions, and providing a recovery process to restore data in the database when there is a database crash or hardware malfunction. The database servers 109 also include software applications that implement the stages of the database designer which are described below. Other functionality for the database servers 109 is possible.

Storage nodes 101 are data processing apparatus that act as storage devices for data stored in the RDBMS. Any number of storage nodes can be used with the RDBMS. Each storage node 101 has access to a local or a non-local data storage device 103 (e.g., a mass storage device) for storing and retrieving data. For example, a database table's data can be distributed to one or more of the storage nodes 101 which are accessible through the computer networks 105. In some implementations, and as described below, storage nodes are used to store redundant versions of data such so that the data can be recovered by the application servers 109 so long as no more than a predetermined number of storage nodes are down, for example.

In general, users interact with terminal equipment 107 such as a keyboard and an display coupled to a storage node 101, or to another computer, to submit queries to the database servers 109. In response, the database servers 109 optimize the queries, generate respective query execution plans, carry out the execution plans against the storage nodes 101, and provide results to the terminal equipment 107.

In a traditional row-oriented DBMS tables are typically stored in a single electronic file. In a column-oriented DBMS a table is typically stored in several files, one per table column, for example. This makes it possible to physically store some of a table's columns in one sort order and others in a different sort order. This approach gives a DBMS greater leverage in exploiting sort orders when it processes a query. Doing so can require, for example, an additional data structure (a permutation) to map a given row's value in one column to its value in a different column sorted in a different order. By way of illustration, given two sets of columns from a table:

$S1=\{C_1, \ldots, C_j\}$, sorted on attributes $A_1, \ldots, A_n$ (written as $C_1, \ldots, C_j | A_1, \ldots, A_n$), and $S2=\{C_{j+1}, \ldots, C_k\}$ sorted on attributes $B_1, \ldots, B_m$ ($C_{j+1}, \ldots C_k | B_1, \ldots, B_m$), a single permutation suffices to map all columns in S1 to the corresponding values from columns in S2. S1 and S2 are examples of projections: sets of columns from one or more tables that are sorted on the same sort order. Projections can exist in both row and column-oriented DBMS's, as well as in DBMS's that are a hybrid of row and column-oriented databases. As such, the database designer system 100 described herein is not limited to a particular type of underlying DBMS.

Figure 1B:
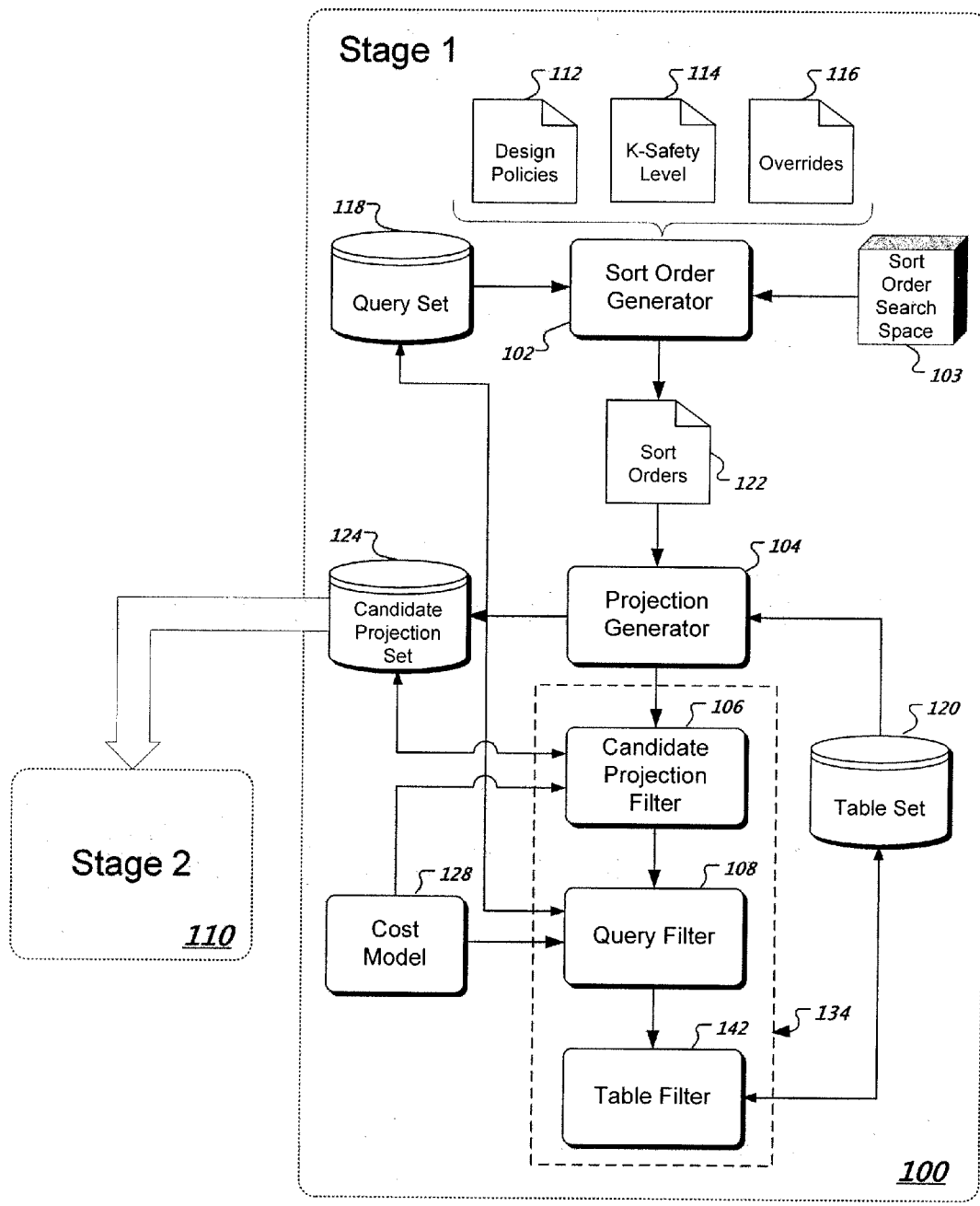
FIG. 1B is a schematic diagram of an example projection designer.

FIG. 1B is a schematic diagram of an example projection designer system 100. The system 100 accepts as input a query set 118, a database schema (i.e., a set of tables) and associated table properties 120, and other parameters, and produces a set of projections 132 that are optimized for one or more of the following goals: improved query performance, reduced or bounded data loading overhead, and minimized storage required for the projections. In various implementations, input parameters to the system 100 are described in TABLE 1, some of which are optional. Other input parameters are possible, however.

TABLE 1

Designer Input Parameters

| INPUT PARAMETER | DESCRIPTION |
| --- | --- |
| Query Set (QS) | An optional set of DBMS queries 118 such as, for instance, SQL queries. If two or more queries only differ in their predicate constants they can be considered to belong to the same query pattern. In some implementations, patterns of queries can be extracted from the input query set 118, and then the system 100 can be invoked on the patterns instead of the original query set 118. This can reduce the number of queries that are considered by the system 100. |
| K-Safety Level (K) | The value of K for the LOAD design policy to make the data k-safe, i.e., in such a manner that all data can be recovered so long as no more than K storage nodes (e.g., data processing apparatuses that act as storage devices) are down. By way of illustration, if a design is k-safe, the design can specify characteristics of at least k + 1 physical versions of each logical column. For each such version of each column, some implementations produce a directive that specifies the storage node where that version is stored, the sort order in which data appear in that version, and the compression format to be used for that version. If an implementation permits different physical versions of the same logical column to be stored with different compression formats, for example, it may turn out to be most effective to use, for instance, run-length coding on a version in which that column is sorted in accordance with its own values, arithmetic coding on a version in which that column is sorted in accordance with the values of one of the other columns, and no compression at all on a version in which that column is sorted on yet another column's values. |
| Design Tables and associated Properties | The DBMS tables being designed for by the system 100 are referred to as "design tables". The tables and their associated properties 120 are provided to the system 100. In some implementations, table properties can include statistical properties such as, for example, the number of rows in a design table and the number of unique values in a column of the design table. Other properties are possible. The statistical properties can be derived from actual table data or estimated. |
| Design Policy | The optional design policy 112 controls the number of projections proposed per design table 120, achieving a balance between query performance and storage/load constraints. When there is an input query set 118 provided, the system 100 will attempt to optimize for as many queries as possible. When there is not an input query set 118 provided, this mode degenerates to a BASIC design mode, which focuses on storage optimization. The design policy parameter can be set per design table, and has the following values to choose from: LOAD, QUERY, and BALANCED. The number of projections is implied by the design policy.<br>Under the LOAD policy, the system 100 proposes exactly K + 1 ("buddy") super projections for a design table. A buddy projection is a projection that includes the same columns as a super projection. A super projection is a projection that includes all the columns in a table.<br>Under the QUERY policy, besides K + 1 super projections for a design table, the system 100 may propose additional (possibly non-super) projections until all queries referencing that table are optimized.<br>Under the BALANCED policy, the system 100 proposes enough projections until it reaches a diminishing return, in that additional projections will not bring sufficient benefits in query optimization. In some implementations, "diminishing return" is defined by an X percentage of design queries that have been sufficiently optimized. (e.g., X = 75%). In further implementations, the cost of the overhead in creating additional projections can be estimated and weighed against the benefit of query processing required by the additional projections. For example, if a new projection that decreases the cost of processing two particular queries by a total of 5 seconds, but increases the cost of data loading by 10 seconds, it may not be worth adding the new projection, and thus would an instance of the diminishing return. |

TABLE 1-continued

Designer Input Parameters

| INPUT PARAMETER | DESCRIPTION |
|---|---|
| Overrides | Overrides are optional projection design hints provided by the user or by a process such as an executing software program.<br>Data related overrides are sort order (e.g. a designed projection for design table T must have its sort columns start with column X), encoding (e.g., a designed projection for table T must have its column X be run-length encoded, and Y be delta encoded), and segmentation (e.g., a designed projection for table T must be segmented by a hash function). The term segmentation refers to a horizontal partitioning of a projection's data across multiple storage nodes. For example, a projection's data could be divided into three non-overlapping partitions where each partition's data resides on a different storage node.<br>Query related overrides allow for optimizing for predicates, different join types (e.g., merge join, ISP join, and run-length encoded join), group-by operations, and for eliminating sorts caused by SQL or analytic order-by operations.<br>An ISP join is an identically segmented projection join. For example, assume that two tables T1 and T2 are joined on condition T1.x = T2.y, the data of T1 and T2 is segmented across three storage nodes, and the chosen projections to process this join query are respectively p1 and p2. If p1 is segmented on column X (or more precisely, a hashed value of column X), and p2 is segmented on column Y, then they are ISP with respect to the above join, and the join can be processed locally on the three storage nodes. Otherwise, if p2 is segmented on a different column, then p2 will first be re-segmented on column Y, and then process the join. This makes the join non-local, in the sense that network data transmission is involved in the process of re-segmenting p2, and this causes non-trivial run-time overhead. So, in general, ISP joins are desirable types of joins in terms of minimizing query processing costs, and good projection design is the key to achieving ISP joins.<br>The analytic order by operation is an extension to SQL to support analytics computation. With a good projection design, the expensive sort operation needed for an analytics computation can be eliminated. This is analogous to the traditional SQL ORDER BY clause. E.g. for this query select * from T order by X, if the projection of T is sorted by X already, the sort operation on X can then be eliminated at run-time when processing this query. For instance, an analytics query could be as follows:<br>select rank( ) over (partition by X order by Y) from T.<br>If the projection of table T is sorted on X, Y, sort operation at run-time on columns X, Y can be eliminated. |

In some implementations, candidate projections 124 are considered by the system 100 in iterations where in each iteration, candidate projections are proposed for the design tables 120 (unless the candidate projection does not optimize for any queries, in which case the candidate projection will not be proposed in the iteration). The details of what an iteration does, regarding how a candidate projection is built and is chosen by the system 100, are described further below. Once an iteration is complete, queries that have been optimized by the newly proposed projections are removed from the query set 118, and the remaining queries will serve as the input to the next iteration. In further implementations, if a design table 120 has reached a targeting number of candidate projections, decided by the projection design policy, it is removed from further consideration so that no further candidate projections are generated for it. This process is repeated until there are no more design tables or queries to propose candidate projections for.

For example, suppose there are four queries in the query set 118 as follows and the design policy for the design tables D1 and D2 is LOAD and the design policy for design table F is QUERY:
  Q1 is a predicate query on design table F
  Q2 is a join query between design tables F and D1
  Q3 is a join query between design tables F and D2
  Q4 is a group-by query on design table F By way of illustration, in a first iteration, a super projection is proposed respectively for design tables F, D1 and D2. The super projections for design tables F and D1 optimize for queries Q1 and Q2. Therefore Q1 and Q2 are removed from the query set 118. Also, since the super projection for design table D2 does not optimize any queries, it is removed from the list of proposed projections. In a second iteration, again a super projection is proposed for each design table. The super projections for design tables F and D2 this time optimize for query Q3, which is then removed from the query set 118. At this point, all queries referencing design tables D1 and D2 have been handled, so they are removed from the set of design tables 120 (after making the projections proposed for each such table K-safe).

Since the design policy for table F is QUERY, an additional projection for F to optimize for Q4 is proposed. In the third iteration, a non-super projection is proposed for F to optimize for Q4. Another non-super projection is added as its buddy (suppose K=1), and this finishes the design process. Note that if there are many non-super projections to propose for a table, in some implementations these can be collapsed into a set of super projections, if doing so reduces load overhead without significantly affecting query performance.

In order to enumerate candidate projections 124, the following aspects are considered:

1. Columns and their sort orders;
2. The run-length encoding possibilities of columns;
3. The segmentation possibilities for columns;
4. Whether prejoin is applicable;
5. The encoding possibilities of columns that are not run-length encoded; and
6. Columns that are SELECT columns.

In various implementations, candidate projections 124 for aspects 1-3 above are based on sort orders 122 enumerated by the sort order generator 102. The winners decided by a cost model are then extended to full projections (by enumerating the possibilities for aspects 5 and 6), and output by the storage designer 110 as final projections 132. The choices for aspect 4 above are made before the sort order enumeration. That is, when a prejoin is applicable, it will be always favored in some implementations by forcing enumeration only of candidate projections based on prejoin tables. A prejoin projection is a special type of projection which materializes the join results of two or more tables. In some implementations, it is only applicable to FK/PK (foreign key/primary key) joins. For example, for the query select * from fact f join dimension d on f.fk=d.pk;

if there is a prejoin projection that materializes that join result, when processing the above query the data from that prejoin can be retrieved, thus eliminating the overhead of processing the join operation at query time.

In some implementations, a prejoin is applicable when all of the following conditions hold or, alternatively, when a subset the following conditions hold:

There is a join query in the input query set 118, where the join is a foreign key/primary key join;

If a merge join between a dimension table and a fact table cannot be used, the dimension table must fit in memory: this is to ensure that when loading new fact data, the maintenance work needed for the prejoin is not overly expensive. In particular, if a hash join used between the fact and the dimension table can build an in-memory hash table for the dimension table, the join operation is considered to not be overly expensive; and The dimension table is not frequently updated: again this is related to LOAD performance.

Note that instead of making the decision on whether to use prejoin candidate projections before the candidate projection enumeration scheme, an alternative is to generate prejoin candidate projections as part of the candidate projection enumeration scheme, and have them compete with the other projection candidates based on the cost model.

For example, consider the following input query: For each US city, list the number of orders made by the customers in that city, as well as the largest quantity among the orders.

```
SELECT C.CITY, COUNT(*), MAX(QUANTITY)
FROM LINEORDER L JOIN CUSTOMER C USING (CUSTKEY)
WHERE C.NATION = 'US'
GROUP BY C.CITY;
```

In the first iteration, the system 100 proposes one or more projections (one per table referenced by the query) to optimize for the query above. At the beginning of this iteration, it is determined that a prejoin between LINEORDER and CUSTOMER is applicable to eliminate the join in Q. Therefore, only prejoin sort orders will be enumerated. Suppose the output sort order of this enumeration, denoted as S, is as follows: the sort columns are C.NATION, C.CITY, both run-length encoded, and the segmentation column is C.CITY. Sort order S is extended to make form a candidate projection as follows. If this iteration targets at generating a super projection for LINEORDER, the SELECT column list of that projection will be NATION, CITY, QUANTITY, <the remaining columns in LINEORDER>. The projection will be sorted on NATION, CITY, QUANTITY, and use DELTAVAL for QUANTITY because it was determined that this encoding scheme takes minimal storage for column QUANTITY. Similarly, the encoding schemes for the other columns in LINEORDER are decided based on the storage characteristics. If this iteration targets at generating a non-super projection specially designed to optimize for Q, then the projection only needs to contain NATION, CITY, and QUANTITY in its SELECT column list.

In various implementations, the encoding types described in TABLE 2 are supported by the system 100:

TABLE 2

Encoding Types

| ENCODING TYPE | DESCRIPTION |
| --- | --- |
| AUTO | This is the default encoding type. For CHAR/VARCHAR, BOOLEAN, BINARY/VARBINARY, and FLOAT columns, Lempel-Ziv-Oberhumer-based (LZO) compression is used. For INTEGER, DATE/TIME/TIMESTAMP, and INTERVAL types, the compression scheme is based on the delta between consecutive column values. Auto encoding is useful for sorted, many-valued columns such as primary keys. It is also suitable for general purpose applications for which no other encoding or compression scheme is applicable. Therefore, it serves as the default if no encoding/compression is specified. |
| DELTAVAL | For INTEGER and DATE/TIME/TIMESTAMP/INTERVAL columns, data is recorded as a difference from the smallest value in the data block. This encoding has no effect on other data types. Encoding Deltaval is suitable used for many-valued, unsorted integer or integer-based columns. The CPU requirements for this type are small, and the data never expands. |
| RLE | Run Length Encoding (RLE) replaces sequences (runs) of identical values with a single pair that contains the value and number of occurrences. Therefore, it is suitable for low cardinality columns that are present in the ORDER BY clause of a projection. In some implementations, if the RDBMS's execution engine can process RLE encoding run-by-run, the system 100 can prefer RLE encoding. The storage for RLE and AUTO encoding of CHAR/VARCHAR and BINARY/VARBINARY is the same in some implementations. |

TABLE 2-continued

Encoding Types

| ENCODING TYPE | DESCRIPTION |
| --- | --- |
| BLOCK_DICT | For each data block of storage, distinct column values are compiled into a dictionary and a list of indexes to represent the data block is stored. BLOCK_DICT is suitable for few-valued, unsorted columns in which saving space is more important than encoding speed. Certain kinds of data, such as stock prices, are typically few-valued within a localized area once the data is sorted, such as by stock symbol and timestamp, and are good candidates for BLOCK_DICT. |
| BLOCKDICT_COMP | This encoding type is similar to BLOCK_DICT except that dictionary indexes are entropy coded. This encoding type can require significantly more CPU time to encode and decode and has a poorer worst-case performance. However, use of this type can lead to space savings if the distribution of data values is extremely skewed. |
| DELTARANGE_COMP | This compression scheme is can used for floating point data, and it stores each value as a delta from the previous one. This scheme is suitable for many-valued FLOAT columns that are either sorted or confined to a range. This scheme can have a high cost for both compression and decompression. |
| COMMONDELTA_COMP | This compression scheme builds a dictionary of all the deltas in the block and then stores indexes into the delta dictionary using entropy coding. This scheme is suitable for sorted FLOAT and INTEGER-based (DATE/TIME/TIMESTAMP/INTERVAL) data columns with predictable sequences and occasional sequence breaks, such as timestamps recorded at periodic intervals or primary keys. For example, the following sequence compresses well: 300, 600, 900, 1200, 1500, 600, 1200, 1800, 2400. Whereas the following sequence does not compress well: 1, 3, 6, 10, 15, 21, 28, 36, 45, 55. If the delta distribution is excellent, columns can be sorted in less than one bit per row. However, this can be very CPU intensive. |

Figure 1C:
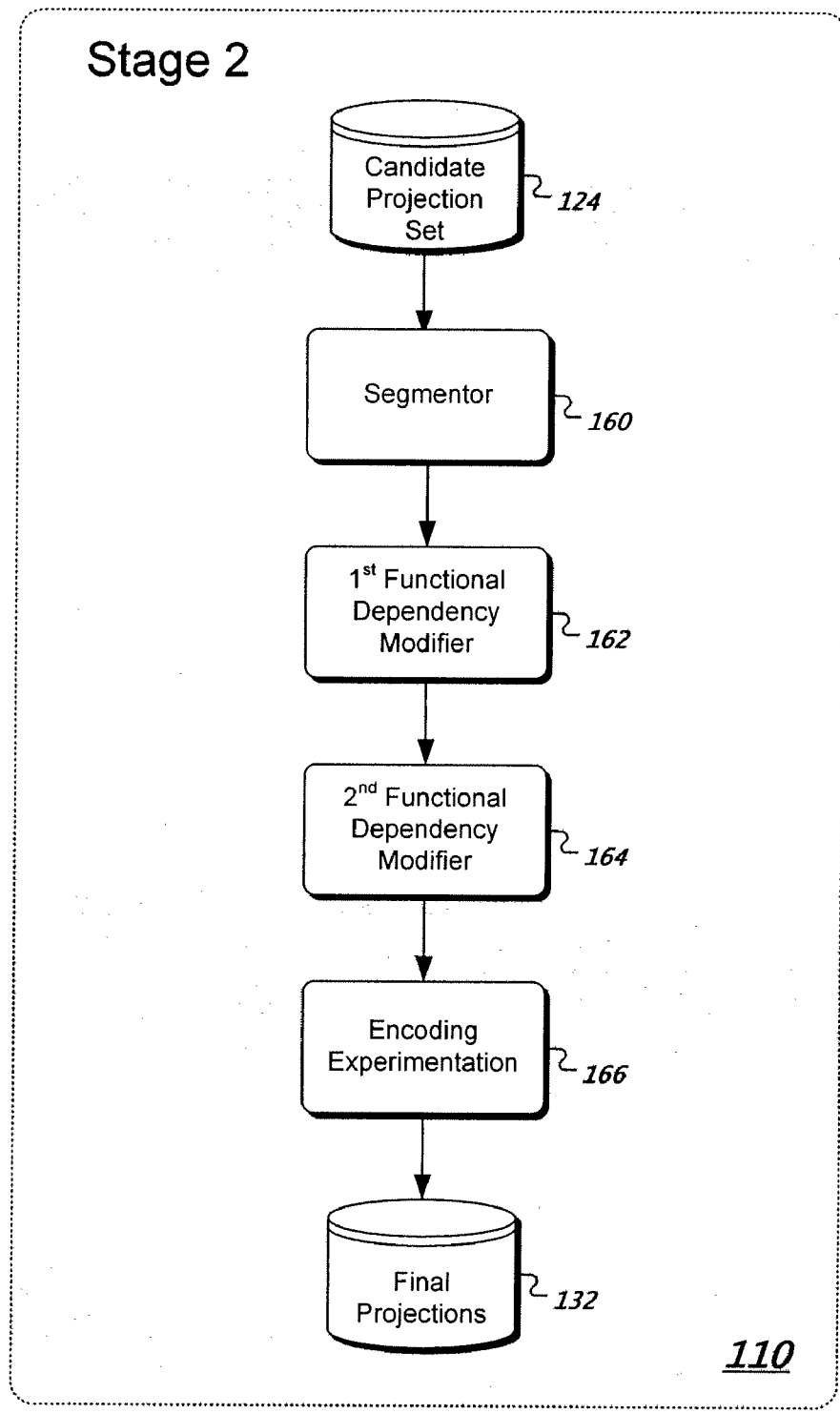
FIG. 1C is a schematic diagram of an example storage designer.

FIGS. 1B and 1C illustrates logical software components and data operated on and generated by the components. The components can be combined into fewer components or divided into more components. Moreover, software implementing the components can reside and execute on a single data processing apparatus or can be distributed to a number of data processing apparatuses that are connected by one or more networks or by other means. The software components of the system 100 will be described at a high level first while deferring description of some of the algorithmic details until later.

Figure 2:
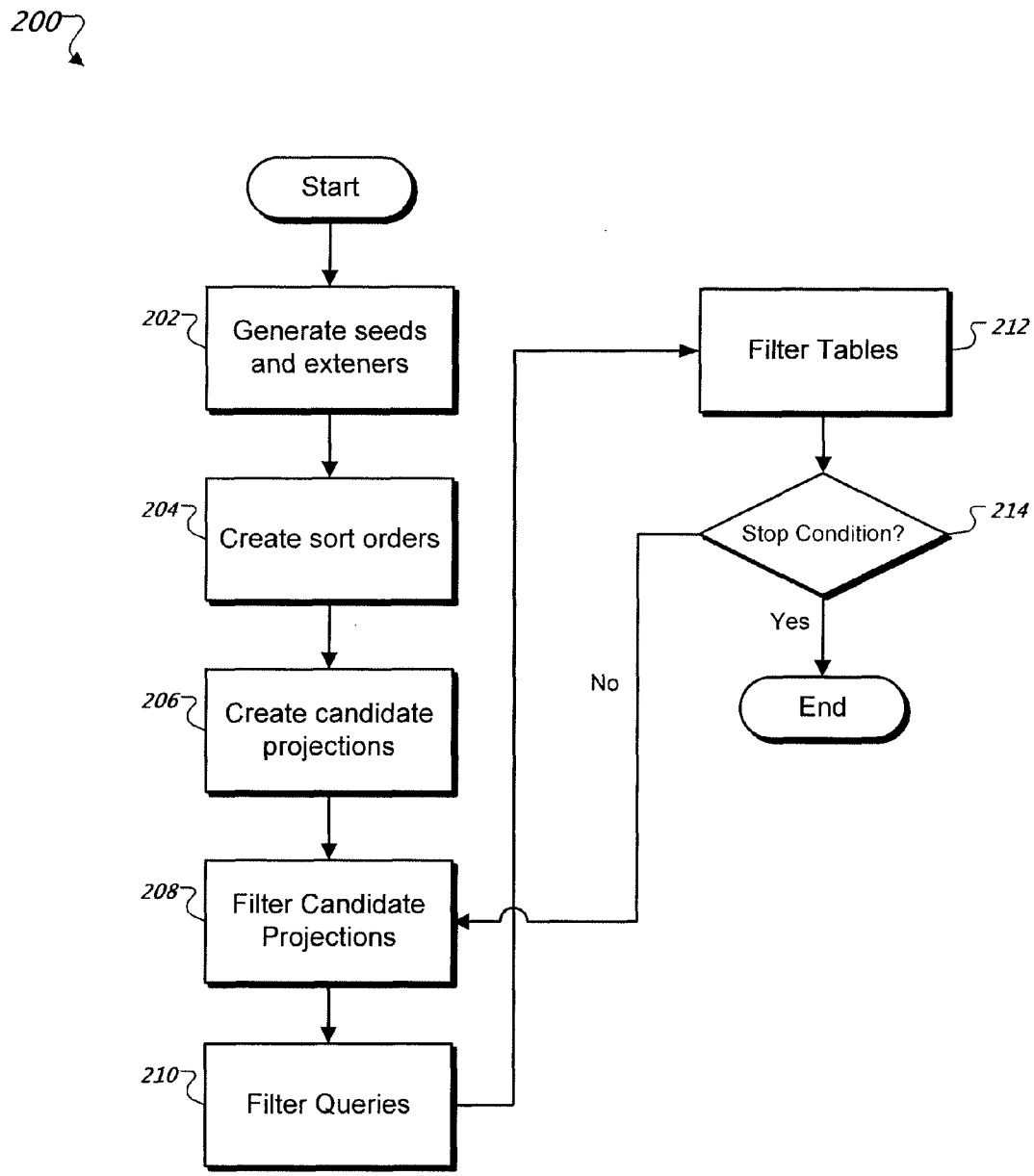
FIG. 2 is a flow diagram of an example technique for designing a projection optimized for a set of queries.

The following describes a high-level view of the system 100 with reference to FIGS. 1B and 2. The system 100 components are organized into two logical stages. In stage 1, the design table set 120 is provided and, optionally, one or more of design policies 112, a query set 118, a K safety level 114 and overrides 116 are provided to the sort order generator 102. If the input query set 118 is empty, stage 1 can be skipped and the system 100 continues processing with stage 2. The sort order generator 102 generates sort orders 122 based on seeds and extenders derived from structural properties (e.g., interesting columns) of the queries 118 (steps 202 and 204 of FIG. 2). Seeds and extenders are described further below. In some implementations, the sort orders 122 are extended to include segmentation information. In further implementations, pruning heuristics can be employed by the sort order generator 102 to reduce the number of sort orders that are enumerated. Pruning heuristics and segmentation information are discussed further below.

The sort orders 122 are then provided to a projection generator 104 component which associates the sort orders with table properties (e.g., a number of rows, a number of distinct values in a column) for the tables they cover (step 206 of FIG. 2). Sort orders that have been have been associated with table properties are referred to as candidate projections 124. The candidate projections are then provided to a process 134 that progressively or iteratively narrows the set of candidate projections 124. The process 134 utilizes four components: a cost model 128, a candidate projection filter 106, a query filter 108, and a table filter 142.

The candidate projection filter 106 uses the cost model 128 to determine points or benefit values for each projection in the candidate projections 124 based on an estimation of how the candidate projection would contribute to optimizing each query in the query set 118. In various implementations, an execution plan is generated for each query in the query set 118 by the cost model 128. An execution plan can be generated using conventional techniques, for example. Specific execution plan highlights are identified in the plans that can potentially improve performance in the RDBMS. In some implementations, execution plan highlights include the presence of a predicate evaluation in the plan that occurs on run-length encoded columns, the presence of a group-by pipeline operator (as opposed to a group-by hash operator), and whether the presence is a merge-join column (as opposed to a hash-join column) in the execution plan. Other execution plan highlights are possible such as, for example:

RLE-Based Optimizations:
RLE on predicate evaluation
RLE on grouping and aggregate keys
RLE on join keys on the FK side for FK/PK joins
Sort-Based Optimizations
Value-index on predicate evaluation
Group-by pipeline
Merge join
ORDER BY sort elimination
Analytics sort elimination
Distributed Optimization
Fully distributed group-by
ISP join
Fully Distributed Analytics A group-by pipeline is a group-by operator where the first column argument of the operation is already sorted. A merge-join operator is a variant of the traditional technique of sort-merge join. The input data to the merge-join operator must be sorted on the join columns in order for merge-join to happen. By way of illustration, for a join query:

select * from T1 join T2 on T1.x=T2.y;

if the chosen projection of T1 is sorted on X, and the projection of T2 is sorted on y, then the merge-join operator can be used.

For each execution query plan, the cost model 128 associates benefit values with the plan's projections based on whether the projection's columns are used in any of the plan's highlights. Plan highlights can result in the same or different benefit values being assigned to a candidate projection based on the type of highlight, the type of query, properties of the query set 118 as a whole, combinations of these, or other factors. For example, an initial assessment could be performed on the set of queries to determine the frequency of different highlights, the frequency of table use, etc., and this information could be used in determining the benefit values or weights for the values.

For example, assume that query Q joins tables T1 and T2, and then performs a group-by operation on T1. More concretely, its SQL formulation could be:

SELECT T1.z, count(*) FROM T1 JOIN T2 ON (T1.x = T2.y) GROUP BY T1.z;

Assume in an execution plan P for the above query that the chosen projections for T1 and T2 are respectively p1 and p2. Assume also that there are plan features in the JOIN (e.g. it is a merge-join), and that benefit values can be assigned to both p1 and p2 as they are both contributing. If there are highlights in the group-by operation, only p1 receives benefit values, as p2 is not contributing. The benefit values of each candidate projection are accumulated and candidate projections whose accumulated benefit values do not satisfy a performance improvement criterion are removed (or "filtered") from the set of candidate projections 124 by the candidate projection filter 106 (step 208 of FIG. 2). In some implementations, the performance improvement criterion dictates that, for each design table, only a single projection candidate having the highest score is selected as the winner, and remaining candidates are discarded in that iteration. In further implementations, the performance improvement criterion dictates that the top N candidates with the highest scores are selected as the winners. In still further implementations, the performance improvement criterion dictates that a pre-defined score threshold is used, such that all candidates whose scores exceed that threshold are chosen as the winners.

The remaining candidate projections in the set of candidate projections 124 are provided to the query filter 108 component. The query filter 108 uses the cost model 128 to determine benefit values for each remaining projection in the candidate projections 124 based on an estimation of how the candidate projection would contribute to optimizing an execution plan for each query in the query set 118. For each query, the total benefit values contributed to candidate projections by the query's execution plan are compared with the total benefit values contributed to candidate projections by the query's execution plan as determined for the candidate projection filter 106. For example, assume that the total of benefit values contributed to candidate projections by an execution plan P for a query Q determined for candidate projection filter is 20 points, and assume also that the total of benefit values contributed to candidate projections by an execution plan $P^1$ for the query Q determined for the query filter 108 is 15 points. An optimization ratio can be determined as $$\frac{P^1}{P} = \frac{15}{20} = 75,$$

meaning that query Q is 75% optimized. In various implementations, a query is sufficiently optimized if the optimization ratio for the query exceeds a threshold (e.g., is greater than 67.4%). In further implementations, the threshold can be determined dynamically based on the average optimization ratio for all of the queries in the query set 118, or a subset thereof, for example. The query filter 108 removes (or "filters") queries from the query set 118 that are deemed to be sufficiently optimized (step 210 of FIG. 2).

A table filter component 142 determines if any of the design tables in the set of tables 120 has reached a target number of candidate projections, determined by the projection design policy 112. If so, the tables are removed from the table set 120 so that no further candidate projections are generated for them (step 212 of FIG. 2). If there are no design policies 112, or the design policies 112 do not dictate the number of candidate projections a table may have, then the table filter component 142 does not remove any tables from the table set 120.

The process 134 determines if a stopping condition has occurred (step 214). The process 134 can stop if the table set 120 is empty, the set of queries 118 is empty, or when the number of queries in the set of queries 118 falls below a threshold (e.g., ten). Otherwise, the process 134 proceeds with another iteration beginning with step 208. The output of stage 1 are the remaining projections in the candidate set of projections 124, which are provided as input to stage 2.

Figure 3:
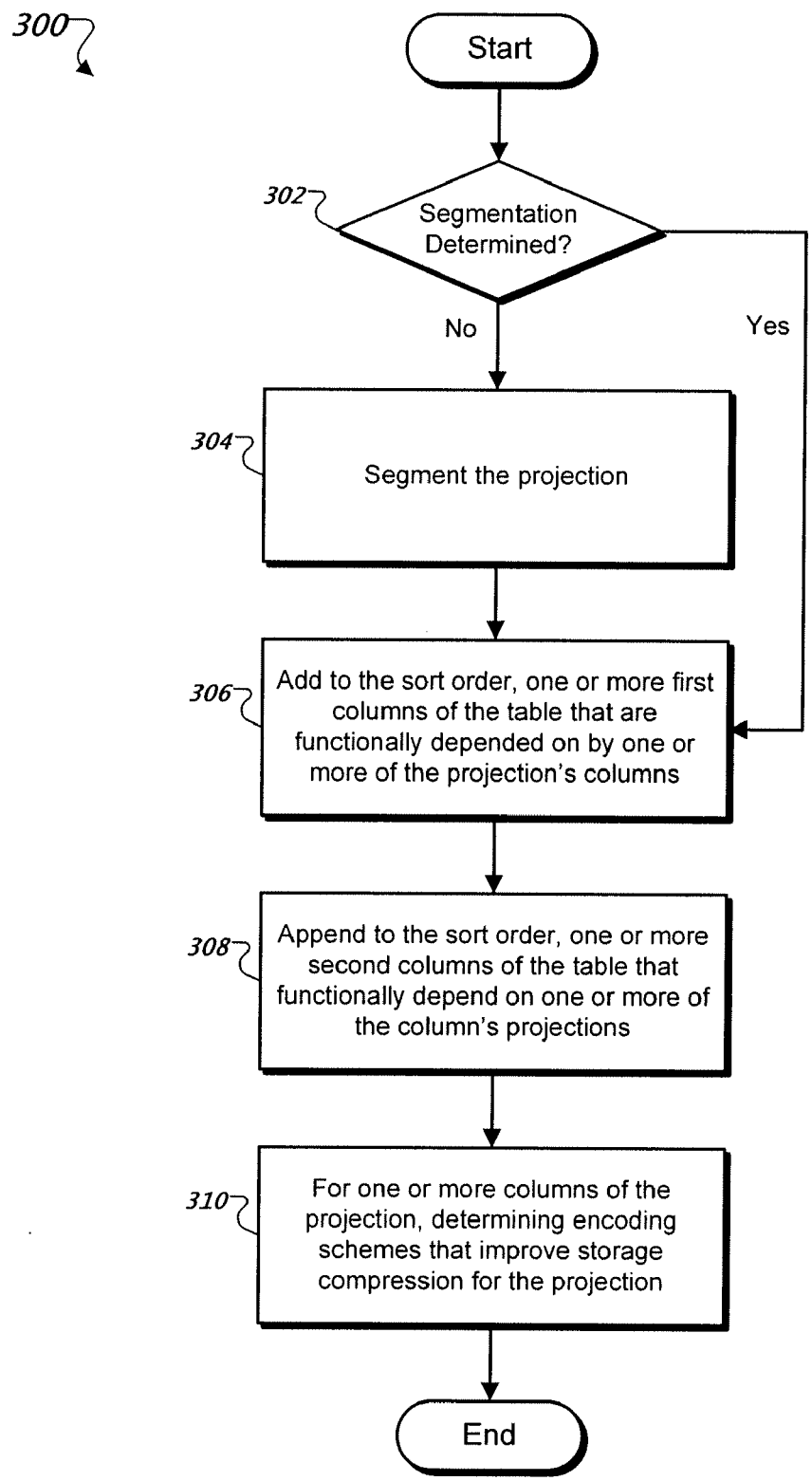
FIG. 3 is a flow diagram of an example technique for optimizing a projection's storage.

In stage 2, and with reference to FIGS. 1C and 3, storage optimization is performed by the storage designer 110. The storage optimization goal is to maximize the effects of storage compression by choosing encoding and compression schemes on a per-column basis to minimize the number of bytes required to store each column. The candidate projections 124 (more precisely, their corresponding sort orders) from stage 1 are further refined by adding additional sort and run-length encoded (RLE) columns where possible, and for those remaining columns trying out other possible encoding schemes, and choosing the ones that provide the best storage compression. If there are no queries in the query set 118, stage 1 can be skipped and the stage 2 starts with an empty set of candidate projections 124 which is extended by stage 2 to include full-fledged projections for maximal storage compression.

The storage optimization algorithm can be performed on a per projection basis by the storage designer 110. Given an input projection p in the candidate projections 124, if the segmentation specification of projection p was determined in the query optimization stage (step 302 of FIG. 3), the process continues at step 306. Otherwise, the projection p is segmented by a set of high-NDV (Number of Distinct Values) columns for the purpose of distributing the data in the projection's table T evenly across the set nodes (step 304) by a segmentor 160 (FIG. 1C). In some implementations, if table T has a set of primary key columns, they are used for the segmentation. Otherwise, the highest-NDV columns are selected as the segmentation columns.

Next, sort and RLE columns are added to the projection p if possible. In some implementations, each projection column is stored on the disk in an encoded and compressed format. Generally speaking, encoding and compression are separate operations. There can be a set of encoding schemes, and a set of compression schemes available to choose from. In some implementations, a projection column's compression scheme is determined by the choice of its encoding scheme. For each SQL data type (integer, float, varchar, etc.), there is a set of encoding schemes applicable to that type in various implementations. Note that it is often the case that there is a trade-off between query optimization and storage optimization. That is, an encoding scheme that aggressively optimizes for storage may hurt query performance, as the encoded column needs to be decoded when it is read back from the disk during query processing. However, among the encoding schemes, RLE can contribute to both query optimization and storage optimization if the RDBMS can operate natively on run-length encoded columns without having to decode them first.

In some implementations, in order for a column to be run-length encoded the column is sorted and the number of RLE buckets needed is below a threshold. For instance, if the column has a stream of values 1, 1, 1, 1, 2, 2, 2, 2 . . . , the column can be run-length encoded more effectively than if the column's stream of values is 1, 2, 1, 2, . . . . The consequence of this condition is that the set of columns to RLE in a projection should be the "prefix column list" of the sort columns in that projection. That is, if a projection is sorted on X and Y, then the possibilities for columns to be run-length encoded are the following: do not RLE any sorted column, RLE X, or RLE X and Y.

By way of further illustration, let the projection p for table T be sorted and run-length encoded on columns X and Y, where X and Y are statistically independent. Let the NDV for column X be 10, and NDV for column Y be 20. Then the combined RLE bucket count of X and Y is 10×20=200. This is denoted as NDV(X, Y)=200. Can another sort and RLE column Z be appended to p where NDV(Z)=50? This depends on the ratio between the combined RLE bucket count after incorporating Z and the row count of T. For example, assume that T has 1,000,000 rows. If Z is independent of X and Y, then NDV(X, Y, Z)=200×50=10,000 and the ratio is 10,000/1,000,000=0.01. Assume that the ratio threshold is 0.33. Since 0.01 is less than 0.33, Z can be added. A sort order is RLE-friendly if its combined RLE bucket count is below the a threshold (e.g., 0.33). In this example, sort order X, Y, Z is still RLE-friendly.

The above illustration assumes that the columns are independent. If X and Y are dependent, then the NDV(X, Y) could be less than 200, for example. In some implementations, the form of dependence is functional dependency. Column Y functionally determines column X, denoted as Y→X, if it holds true that given any two tuples r1 and r2, if r1.Y=r2.Y, then r1.X=r2.X. For example, assume there is a table storing the address information of U.S. companies and that the table contains two columns (there are other columns such as "company_name" which are ignored in this example), "state" and "zip_code". Then zip_code→state, because for example, any company whose zip_code is 01821 necessarily implies that it is in the state of Massachusetts.

One property of functional dependency is, if Y→X, and the projection is sorted on Y, X, then NDV(Y, X) is equal to NDV(Y). For example, the number of distinct zip_code, state pairs is equal to the number of distinct zip_code values. So, in the above example setup, if Y→X, then NDV(Y, X)=NDV(Y)=20. In comparison, as was described above, given two columns X and Y that are statistically independent the combined number of distinct X,Y pairs is equal to the multiplied result of NDV(X) and NDV(Y).

The above property of functional dependency can be used in storage optimization as follows: if a projection is already sorted on Y, and there is a functional dependency Y→X, column X can be added to the sort and RLE column list without increasing the combined RLE bucket count. As a concrete example, suppose the input projection candidate p is already sorted and run-length encoded on zip_code. Then a new sort and RLE column, state, can be added to p, and the NDV(zip_code, state)=NDV(zip_code).

A $1^{st}$ functional dependency modifier 162 (FIG. 1C) adds columns of table T to projection p that are functionally depended on by one or more of the columns in p (step 306 of FIG. 3). For example, assuming that the input sort order is Y and that Y→X, then the output sort order is X,Y if Y is not a so-called "sort opt" column, or otherwise the output sort order is Y, X. A sort opt column is a column that enables a sort-based optimization to be considered for the query. Depending on the projection's sort order, some sort operations can be optimized away for queries if a sorted projection is used to execute the query. For example, if a projection is sorted by Y, Z and the query requests order by Y, then when using this projection data does not need to be sorted and, in this case, Y is considered a sort opt column. Similarly, if two projections involved in a join are both sorted by their join columns, then a merge join can be applied.

A $2^{nd}$ functional dependency modifier 164 (FIG. 1C) appends columns of the table T to the projection p that functionally depend on one or more columns in p assuming that doing so would result in p being RLE-friendly (step 308 in FIG. 3). For example, assuming Z→Y, a projection can be extended to X, Y, Z if the projection is still RLE-friendly. Note Z can be added to the projection even if there is no such functional dependency, as long as the resulting sort order is RLE-friendly. With functional dependency, the resulting sort order is more likely to be RLE-friendly. The above step is repeated to add more sort columns to the sort order, unless there is no more "room" for more RLE columns.

In some implementations, high-NDV columns are added to the end of the sort column list, without run-length encoding them. This helps reduce non-determinism in the physical ordering of tuples, and also helps improve performance by adding high NDV columns in certain optimizations. Overall, the goal of this step is to build a longer sort and RLE column list for p, which contributes to storage compression.

The encoding schemes for the remaining columns are then determined (step 310 in FIG. 3) by the encoding experimentation component 166 (FIG. 2C). At this point, the sort column list for p has been selected, where a certain prefix of the sort columns are run-length encoded. For those remaining columns (the unsorted columns and the sorted ones that are not run-length encoded), encoding experiments are performed by trying out all possible encoding schemes, and choosing the ones that provide the best storage compression. For example, assume that p is sorted and run-length encoded on X, Y. Now, for column Z, assume that there are three possible encoding schemes E1, E2 and E3. All three encoding schemes are attempted on Z, when preserving the sort order of X,Y, and the encoding schemes which result in the lowest number of bytes for storing Z in its compressed form are selected. One possible way of doing this is to create one projection for each encoding scheme of Z. In some implementations, the syntax for creating projections is as follows:

| DESCRIPTION | EXAMPLE |
| --- | --- |
| Column encodings: | CREATE PROJECTION P1 (<br>    date ENCODING RLE,<br>    state ENCODING RLE,<br>    price ENCODING AUTO<br>) |
| Subset of columns: | AS<br>SELECT t.date, c.dstate, f.price |
| Joins (optional): | FROM fact f, time t, customer c<br>WHERE f.time_key = t.time_key<br>AND c.cust_key = f.cust_key |
| Sort order: | ORDER BY t.date, c.state |
| Data distribution/ segmentation: | SEGMENTED BY hash(price) ALL NODES; |

By way of illustration, assume the definition of projection pi ($1<=i<=3$) is as follows:

```
create projection pi(X ENCODING RLE, Y ENCODING RLE, Z
ENCODING Ei) as select * from T order by X, Y;
```

Data is inserted into pi and the number of bytes consumed in storing column Z in pi is calculated. It is determined that Ej is the winner if the byte count for column Z in pj is the minimal among all pi's.

While the above scheme is correct, it can be inefficient. In some implementations, an algorithm is used that is more efficient in that it minimizes the number of sort operations needed. This algorithm is illustrated with the following example. Assume that for table T, a sort order that has been built so far is sorted on X, Y, Z, W, where X, Y are run-length encoded. Also assume that there are two unsorted cols U and V. It is then decided the best encoding schemes for columns Z, W, U, and V. To do so, a table T' with schema (X, Y, Z_1, ..., Z_n, W_1, ... W_n, U_1, ..., U_n, V_1, ..., V_n) is created, where n is the number of encoding choices. The super projection of T' is created to be sorted on X, Y, Z_1, W_1, and run-length encoded on X, Y. Specifically, the super projection p' is defined as follows:

```
create projection p'
(X ENCODING RLE,
    Y ENCODING RLE,
    Z_1 ENCODING E1,
    Z_2 ENCODING E2,
    ...
    Z_n ENCODING En,
    W_1 ENCODING E1,
    ...
    W_n ENCODING En,
    U_1 ENCODING E1,
    ...
    V_n ENCODING En)
as select * from T'
order by X, Y, Z_1, W_1;
```

Encoding Ei denotes the ith encoding scheme. Note that p' sort columns need not involve Z_2, Z_3, etc., before W_1, because these Z_i columns have the same values as Z_1. Next, data is loaded into T', with the following statement.

```
insert into T' (X, Y, Z_1, ..., Z_n, W_1, ... W_n, U_1,
..., U_n, V_1, .., V_n) as select X, Y, Z Z_1, Z Z_2, ... Z
Z_n, W W_1, ..., W W_n, U U_1, ..., V V_n from T;
```

Once this is done, the used byte count can be checked for all column Z_i's, to decide which encoding Ei is the best for column Z. This is also done for the other columns W, U and V. Note that in the above algorithm, the overhead of conducting the encoding experiments from sorting the data is minimized because the computation needed to obtain the final encoded results is shared.

If a table T has a large number of rows it could take a long time to perform an encoding experiment (e.g., using the insert select statement described immediately above). In some implementations, if this is the case, a random sample of a subset of rows in T is used to perform the encoding experiments. More specifically, a subsequence of rows is used since row order matters. The sequence of randomly sampled rows respects the row ordering in the original table T. This is important to ensure that a valid result is obtained when performing the encoding experiments. For example, suppose a column X in table T has the following sequence of rows: 1, 2, 3, 4, 5 . . . . In the sampled set of rows, the values of column X could look like the following: 1, 2, 4, . . . . However, if the sampled set of rows were 4, 1, 2 . . . , 4 is out of order and could cause the encoding experiments to yield incorrect results.

Statistically, a sufficiently large random sample set should enable an accurate assessment for each column of the effects of different encoding schemes. By way of illustration, assume that table T has 1 billion rows. A tunable parameter can be used by the storage designer 110 to set a threshold for the number of rows to participate in the encoding experiments. If the threshold is 1 million rows, for instance, then 1 million rows are randomly sampled in T, and then for each column, all encoding schemes are tested on these 1 million rows (instead of the original 1 billion rows).

In further implementations, the random sampling can be tightly integrated with the algorithm for the performing encoding experiment so that the sampled rows do not first have to be stored in an intermediate "staging table" before the experiments are performed on the rows. The staging table approach incurs additional disk input/output unnecessarily.

Sort Order Generation

The following provides additional algorithmic details regarding how sort orders 122 are generated by the sort order generator 102. The sort order generator 102 parses the query set 118 to extract useful query meta-data from the join graph data structure for each query in the set 118 (e.g., the predicate and grouping columns in the queries). The queries 118 are then associated with the design tables 120 that they reference. A single-table query is associated with exactly one table, whereas a join query is associated with more than one table, for instance. The sort order generator 102 then explores a search space 103 of sort orders, and identifies the ones that may benefit query evaluation, referred to as interesting sort orders (e.g. a sort order with sorted columns X, Y benefits a GROUP BY query on X, Y because a group-by pipeline can be used). This following describes how interesting sort orders are enumerated by the sort order generator 102.

A list of columns L from a table T is RLE-friendly, if the number of RLE buckets defined by sorting and run-length encoding L does not exceed a predefined threshold, which in some implementation is T's row count divided by a constant (e.g., 3). Other ways for determining the threshold are possible. Let L1 and L2 be two lists that contain the same set of columns (e.g. L1=<A, B, C> and L2=<B, A, C>). Clearly, L1 is RLE-friendly iff L2 is RLE-friendly. Therefore, the concept of RLE-friendliness is also well-defined on a set of columns.

Given a list of columns L, let function LRC(L) compute the longest prefix of L that is still RLE-friendly. For example, given a table Quotes(exchange, symbol, price, time), let L=<exchange, symbol, time>, then LRC(L) may return <exchange, symbol>.

A sort order SO consists of the following components, a subset of what a projection contains:
 A non-empty list of sort columns, referred to as SC; and
 A possibly empty list of RLE encoded columns, referred to as RC, which is equal to LRC(SO.SC) (hence it is a possibly empty prefix list of SC, and is always RLE-friendly). For example, if SC is <A, B, C>, then RC might be < >, <A>, <A, B>, or <A, B, C> depending on the number of distinct values (NDVs) of columns A, B and C, and correlations among them.

A self-complete notation for a sort order is the following: a sort order is denoted as a list of its sort columns, where a prefix list is underlined to represent the RLE encoded columns. For example: SO=<A, B, C> means SO.SC=<A, B, C>, and SO.RC=<A, B>. Since SO.RC is computed from LRC(SO.SC), SO.SC can be used to represent the sort order SO without ambiguity. That is, it can be written as SO=<A, B, C>. The latter notation is adopted in the following text, as it is more compact.

For efficiency of the enumeration process, the number of objects involved in the enumeration can be reduced. This is achieved by defining the enumeration process to operate on classes of sort orders (SOCs), rather than individual sort orders. An SOC object will be defined below after covering its preliminaries. A SetList object is a list of sets of columns. For example, let SetList object SL=<{A}, {B, C}, {D}, {E, F}>. When a set is a singleton set, the curly braces are omitted. So SL in the previous example can also be written as <A, {B, C}, D, {E, F}>. By definition, a list-element in a SetList object is a set of columns. For example, {E, F} is a list-element of SL. The length of a SOC, denoted as |SOC|, is the number of list-elements in it. A SetList object with a single list-element (i.e., |SOC|=1) is a singleton SetList. For example, <A> and <{A, B}> are both singletons.

A SetList object is a compact representation of a class of lists. A list is derived from a SetList SL as follows: for each list-element S in SL (note S is a set of columns), replace S with a particular permutation of columns in S. To continue the above example, SL represents four lists: L1=<A, B, C, D, E, F>, L2=<A, C, B, D, E, F>, L3=<A, B, C, D, F, E>, L2=<A, C, B, D, F, E>. In other words, these four lists can be derived by SL. The function that computes the set of lists derived from a SetList object is referred to as ExpandSL. In the above example, ExpandSL(SL)={L1, L2, L3, L4}.

An SOC object is a non-empty SetList object, which represents a class of lists of sort columns. A SOC object is a compact representation of a class of sort orders. A sort order SO is derived from a SOC, if SO.SC belongs to ExpandSL (SOC). For example, let a query Q have group-by operation on columns A, B and C. The SOC object generated from the group-by operation of Q, which may enable group-by pipeline strategy, is <{A, B, C}>. The six sort orders derived from SOC are SO1 through SO6:
 SO1=<A, B, C>,
 SO2=<A, C, B>,
 SO3=<B, A, C>,
 SO4=<B, C, A>,
 SO5=<C, A, B>,
 SO6=<C, B, A>.

The function that computes the set of sort orders derived from a SOC object is referred to as ExpandSOC. In the above example, ExpandSOC(SL)={SO1, . . . , SO6}. Clearly, a SOC object can derive multiple sort orders, iff it contains a list-element which is a non-singleton set.

In various implementations, SOCs are enumerated bottom up beginning with a set of SOCs referred to as seeds. During the enumeration process, each SOC is refined or extended. When a SOC is refined, the set of ExpandSOC(SOC) shrinks. For example, a SOC=<{A, B, C}> may be refined to SOC'=<B, {A, C}>, where ExpandSOC(SOC') is clearly a subset of ExpandSOC(SOC). When a SOC is extended by an extender, its length increases. For example, a SOC'=<B, {A, C}> may be extended to <B, {A, C}, D>. The initial SOCs are referred to as seeds, and the columns used to refine or extend existing SOCs are referred to as extenders. Each extender is a singleton SOC.

For example, for the following query:

```
SELECT C.CITY, COUNT(*), MAX(QUANTITY)
FROM LINEORDER L JOIN CUSTOMER C USING (CUSTKEY)
WHERE C.NATION = 'US'
GROUP BY C.CITY;
```

Let a seed be SOC=<C.NATION>, and an extender E=<C.CITY>. When SO is extended with E to obtain a new SOC, SOC'=<C.NATION, C.CITY>.

As another example, let SOC=<{A, B}>, and extender E=<B>. SO can be refined with E to obtain a new SOC, SOC'=<B, A>. Intuitively, a SOC object that represents multiple sort orders has no "preferences" among these sort orders. However, when it is refined by an extender which has its own preferences over projections, the resulting SOC will reflect the preference from that extender. In the previous example, SOC has no preference over sort orders <A, B> or <B, A>, but extender E has a preference over projections with column B being ahead of the list of sort columns.

Extenders are applied to a SOC for refinement or extension. Given a SOC object soc and an extender e, the operation that applies e to soc for extension or refinement to obtain a new SOC is denoted as APPLY(soc, e). The semantics of APPLY are as follows: for each list-element l in soc, split l into two list-elements (l SET-INTERSECT e) followed by (l SET-DIFFERENCE e). Finally, for the columns in e that are not in soc, if there is any, append them as a list-element to the resulting SOC. TABLE 3 includes examples of using the APPLY function to extend and refine an SOC.

TABLE 3

APPLY Examples

| EXAMPLE | DESCRIPTION |
|---|---|
| APPLY(<A>, <B>) = <A, B> | Extension |
| APPLY(<{A, B}>, <B>) = <B, A> | Refinement |
| APPLY(<{A, B}>, <C>) = <{A, B}, C> | Extension |
| APPLY(<A, {B, C, D}, E >, {B, D}>) = <A, {B, D}, C, E> | Refinement |
| APPLY(<A, {B, C, D}, E, {F, G, H}, I>, {B, D, F, J, K}) = <A, {B, D}, C, E, F, {G, H}, I, {J, K}> | Refinement |

In some implementations, the number of extenders generated from predicate columns can be limited. Once the predicate columns have been extracted to generate extenders, their occurrences in the queries 118 is counted as the "popularity" metric (adjusted by query weights). Each query can be assigned a numeric (user-specified) weight value, which can be used in a linear combination to adjust the benefit points.

For example, assume that query Q1 has an "RLE predicate" plan feature when projection candidate P1 is chosen, worth 3 points. And assume that query Q2 has a group-by pipeline feature when projection candidate P2 is chosen, worth 5 points. However, if query Q1 has weight 5, and query Q2 has weight 1, Q1's points are scaled by 3×5=15. In this example, projection candidate P1 wins. However, if queries Q1 and Q2 have the same weights, P2 wins. By default, in some implementations all queries have the same weights. If this is the case, then only the top N most popular extenders for the enumeration are retained.

Let APPLY(s, e)=s'. Let the set of columns c be defined by taking columns from s', starting from the columns in the first list-element of s', up to subsequent list-elements until all columns in e have been included. APPLY succeeds, iff c is RLE-friendly. In the second to last example of APPLY above, c={A, B, D}. In the last example of APPLY above, c={A, B, ... , J, K}.

Having defined the APPLY function, the description of the enumeration process will resume. As described above, for existing SOCs, extenders continue to be applied to them (using the APPLY function) until no new SOCs can be generated this way. Those SOCs that are extended or refined are then discarded, because the newly generated ones are superior to them. An SOC that cannot be further extended or refined is referred to as terminal. At the end of the repeated APPLY process, all remaining SOCs are terminals.

Next, ExpandSOC is applied to each terminal SOC to derive the set of sort orders from it. This provides the set of sort orders 122. In some implementations, before the sort orders 122 are provided to the projection generator 104, they are extended based on segmentation candidates. In some implementations, segmentation candidates are generated from group-by columns, join columns, and columns in large tables that have high cardinality (whether a table is large can be deduced from the FK/PK constraints and the size of its sample dataset). Suppose for each table in the table set 120, there is a list of segmentation candidates. Each sort order anchored on that table is extended with each segmentation candidate respectively, generating the final list of sort orders with associated segmentation specifications.

For example, let the query set 118 consist of the following single query:

```
SELECT symbol, date, SUM(volume)
FROM Trades
WHERE date between '2009-06-01' and '2009-06-05'
GROUP BY symbol, date;
```

The seeds are: <date>, <{symbol, date}>. The extenders are: <date>, <{symbol, date}>. After the enumeration, the terminal SOCs include <date, symbol> and <symbol, date>. Let there be two segmentation candidates: NONE (i.e., replicated to all storage nodes) and HASH(symbol, date). This leads to four sort orders with associated segmentation specifications:

```
<date, symbol> REPLICATED ALL SITES
<date, symbol> SEGMENTED BY HASH(date, symbol) ALL SITES
<symbol, date> REPLICATED ALL SITES
<symbol, date> SEGMENTED BY HASH(date, symbol) ALL SITES
```

When a projection is replicated to all sites (REPLICATED ALL SITES), each storage node has a complete copy of the projection's data. When a projection is segmented by a hash function (SEGMENTED BY HASH), the projection's data is distributed to the storage nodes according to the hash function. That is, each storage node does not have a complete copy of the data.

The following paragraphs describe how the sort order generator 102 generates seeds and extenders in various implementations. Because an exhaustive exploration of the sort order search space 103 is often computationally infeasible, the search space 103 can be pruned by only generating so-called interesting seeds and extenders, which are defined based on the structural properties of queries in the query set 118 and in some implementations as described in TABLE 4.

TABLE 4

Seeds and Extenders

| QUERY | SEEDS AND EXTENDERS |
|---|---|
| Predicate Columns | For a query Q, let the table T in its FROM clause have a conjunct of n single-table predicates, where each conjunct involves a set of columns from T referred to as Ci. Then each Ci that is RLE-friendly generates a seed SOC := <Ci>, and an extender E := <Ci>.<br>Take the following query as an example:<br>SELECT *<br>FROM Company C<br>WHERE C.industry = 'IT' AND (C.state in ('MA', 'NY') or C.region = 'NW') AND C.employeeCount < 100;<br>The two extenders extracted from this query will be <industry> and <{state, region}>. Note that <employeeCount> is not a seed or extender because it is not RLE-friendly. |
| Group-by Columns | For a query Q with S being its set of group-by columns, <{S}> becomes a seed. Also, when S is RLE-friendly, it becomes an extender as well. For example, for the query below, <{phone_number, call_type}> is a seed, but not an extender because it is not RLE-friendly:<br>SELECT phone_number, call_type, COUNT(*) as num_calls<br>FROM CDR<br>WHERE date between '2009-03-01' and '2009-06-01'<br>GROUP BY phone_number, call_type; |

TABLE 4-continued

Seeds and Extenders

| QUERY | SEEDS AND EXTENDERS |
|---|---|
| Aggregate Columns | Each aggregate column becomes an extender if it is RLE-friendly. When such an extender is applied to a SOC, it is required that for at least one group-by query in which this extender is an aggregate column, that SOC includes all the group-by columns. Intuitively, this check corresponds to the RLE-optimization for evaluating group-by aggregates. |
| Order-by Columns | For a query Q with L being its list of ORDER-BY columns, <L> becomes a seed. |
| PARTITION and ORDER Columns in Analytic OVER Clauses | For an analytic function with set S being the partition-by columns and list S being the order-by columns in its OVER clause, <{S}, L> becomes a seed. For example, for the analytic function RANK( ) OVER (PARTITION BY city, month ORDER BY sales), <{city, month}, sales> is a seed. |
| Join Columns | Join columns are similar to group-by columns: Let table A be one of the two input to a join operator. Let S be the set of join columns from A. Then <{S}> becomes a seed. Also, when S is RLE-friendly, it becomes an extender as well. |

The following paragraphs describe how the sort order generator 102 applies overrides (TABLE 1) in various implementations. Overrides are optional projection design hints provided by the user, and they can be categorized into data related overrides (TABLE 5) and query related overrides that are used to prune the sort order search space 103. In some implementations, query related overrides generally correspond to execution plan highlights described above. However, other query related overrides are possible.

TABLE 5

Data Related Overrides

| OVERRIDE | DESCRIPTION |
|---|---|
| Sort Order | For example, a designed projection for table T must have its sort columns start with X. At the beginning of the SOC enumeration, after generating seeds, prune them to only retain the ones corresponding to the sort order overrides. For example, let table T have two seeds <{A, B}> and <{B, C}>. If there is an additional sort order override on {A}, then the former seed is refined to <A, B>, and the latter seed is pruned away. |
| Encoding | For example, a designed projection for table T must have its column X be RLE encoded, and Y be DELTAVAL encoded. For RLE override, during the SOC enumeration, a sort order is retained, if it contains all the columns specified in the RLE override, where these columns are indeed run-length encoded in the sort order. For example, let a sort order produced during the SOC enumeration be s = <A, B, C>, and let <A, B> be its prefix list of RLE columns. If there is an input RLE override on column B, s will be retained, but if the RLE override is on column C, s is discarded. For a non-RLE override, the override is incorporated after the SOC enumeration. |
| Segmentation | For example, a designed projection for table T must be segmented by HASH(X). This type of override is used to prune the generated segmentation candidates. |

Query related overrides are translated to data related ones as follows. A predicate optimization override or RLE join override is translated to sorting and RLE encoding that set of predicate/join columns. A merge join or group-by pipeline override is translated to a sort order override (e.g. to do group-by pipeline on columns X and Y of table T, in the designed projection for T, the first two sort columns should be X and Y in any ordering). Similarly, a sort elimination override is translated to a sort order override. An ISP join or 1-phase group-by is translated to segmentation override.

Figure 4:
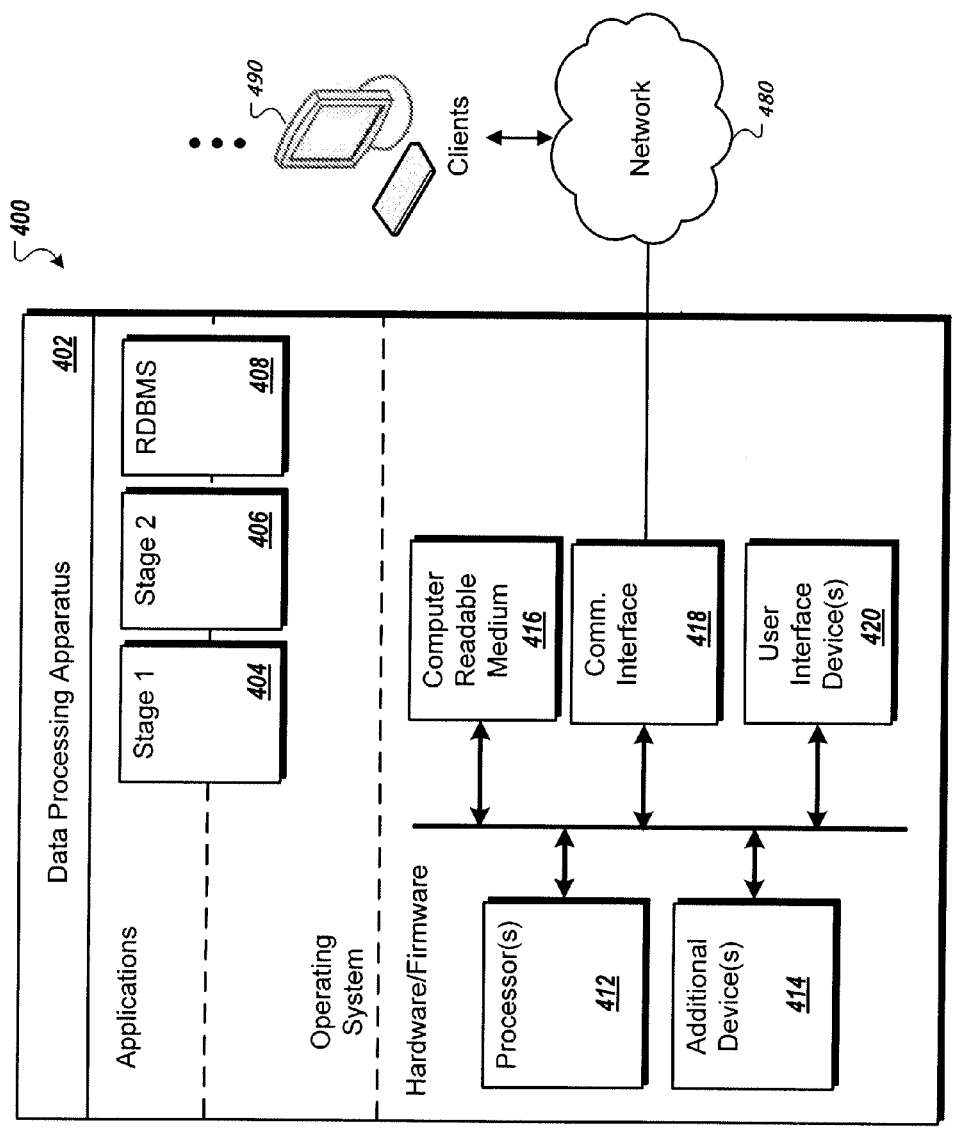
FIG. 4 is a schematic diagram of an example system configured to design databases.

FIG. 4 is a schematic diagram of an example system 400 configured to provide related images. The system generally consists of a server 402. The server 402 is optionally connected to one or more user or client computers 490 through a network 480. The server 402 consists of one or more data processing apparatuses. While only one data processing apparatus is shown in FIG. 4, multiple data processing apparatus can be used. The server 402 includes various components, e.g. executable software programs, including components for implementing stage 1 (404) and stage 2 (406) of the database designer system 100.

Each component runs as part of the operating system on the server 402, runs as an application on the server 402, or runs as part of the operating system and part of an application on the server 402, for instance. Although several software components are illustrated, there may be fewer or more software components. Moreover, the software components can be distributed on one or more data processing apparatus connected by one or more networks or other suitable communication mediums.

The server 402 also includes hardware or firmware devices including one or more processors 412, one or more additional devices 414, a computer readable medium 416, a communication interface 418, and one or more user interface devices 420. Each processor 412 is capable of processing instructions for execution within the server 402. In some implementations, the processor 412 is a single or multi-threaded processor having one or more processor cores. Each processor 412 is capable of processing instructions stored on the computer readable medium 416 or on a storage device such as one of the additional devices 414. The server 402 uses its communication interface 418 to communicate with one or more computers 490, for example, over a network 480. Examples of user interface devices 420 include a display, a camera, a speaker, a microphone, a tactile feedback device, a keyboard, and a mouse. The server 402 can store instructions that implement operations associated with the components described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

creating a set of candidate projections each being based on a column sort order in a set of column sort orders and being associated with properties of one or more tables in a set of tables to which the column sort order applies, wherein a column sort order is a sequence of one or more columns, each column's data being stored in an order; and until a stopping condition is reached, progressively narrowing the set of candidate projections and a set of queries by eliminating candidate projections that do not satisfy a performance improvement criterion for remaining queries based on the properties associated with the candidate projections;

wherein narrowing queries comprises:

generating an execution plan for each of one or more remaining queries in the set of queries wherein each execution plan is based on one or more of the remaining candidate projections;

determining a difference in a level of optimization of each execution plan between the execution plan as optimized by the set of candidate projections before a most recent narrowing of the set of candidate projections and the execution plan as optimized after the most recent narrowing of the set of candidate projections;

determining for each query whether the query is sufficiently optimized based on the determined difference in the level of optimization; and eliminating queries from the set of queries that are sufficiently optimized.

2. The method of claim 1 wherein narrowing the set of queries further comprises eliminating queries from the set of queries that are sufficiently optimized by the remaining candidate projections.

3. The method of claim 1 wherein one or more of the candidate projections in the set of candidate projections is each associated with segmentation information that describes how data of the candidate projection would be stored across a plurality of nodes.

4. The method of claim 3 wherein the segmentation information specifies a set of one or more highest number of distinct value columns in the candidate projection to be used for distributing the data across the nodes.

5. The method of claim 1 wherein progressively narrowing further comprises removing tables, from the set of tables, that have candidate projections in the set of candidate projections, that are no longer referenced by remaining queries in the set of queries.

6. The method of claim 5 wherein stopping condition is reached when the set of tables is empty, when the set of queries is empty, or when a number of queries in the set of queries is beyond a threshold.

7. The method of claim 1 wherein progressively narrowing further comprises removing tables from the set of tables that have a number of candidate projections, in the set of candidate projections, that has reached a target number of projections.

8. The method of claim 7 wherein the target number of projections is determined by a design policy.

9. The method of claim 8 wherein the design policy favors query performance, load performance, or a balance between query and load performance.

10. The method of claim 9 wherein the balance is achieved by increasing a number of projections in the candidate set of projections until query optimization is no longer benefited.

11. The method of claim 10 wherein query optimization is no longer benefited when a percentage of queries in the set of queries that have been optimized is beyond a threshold.

12. The method of claim 7 wherein the target number of projections allows for up to K node failures.

13. The method of claim 1 wherein eliminating candidate projections comprises generating an execution plan for each of one or more remaining queries in the set of queries wherein each execution plan is based on one or more of the remaining candidate projections.

14. The method of claim 13 further comprising:
for each execution plan, associating a benefit value with each candidate projection used by the execution plan wherein the benefit value is based on a contribution the candidate projection makes towards optimizing the execution plan; and
eliminating candidate projections from the set of candidate projections that do not satisfy the performance improvement criterion based on respective benefit values associated with the candidate projections.

15. The method of claim 14 wherein the benefit value associated with each candidate projection is determined based on whether the candidate projection's columns are used in any of the execution plan's highlights.

16. The method of claim 15 wherein a plan highlight is a run-length encoding on a predicate evaluation, on a grouping and aggregate keys, or on join keys on a foreign key side of a foreign key/primary key join.

17. The method of claim 15 wherein a plan highlight is a sort-based optimization on a value index on a predicate evaluation, on a group-by pipeline, on a merge join, on an order-by sort elimination, or on an analytics sort elimination.

18. The method of claim 15 wherein a plan highlight is a fully distributed group-by or an identically segmented projection join.

19. The method of claim 1 wherein the properties of a table in the set of tables are statistical properties and include a number of rows in a column of the table, a number of unique values in a column of the table, or both.

20. The method of claim 1 wherein creating the set of candidate projections further comprises:
generating seeds and extenders based on structural properties of queries in the set of queries;
creating a set of column sort orders from the seeds and extenders;
adding segmentation column sort orders to the set of column sort orders; and
creating the set of candidate projections from the set of column sort orders.

21. The method of claim 20 wherein the structural properties include one or more columns relied on by the set of queries and wherein a column in the one or more columns is a predicate column, a group-by column, an order-by column, a join column, or an analytics column.

22. The method of claim 20 wherein one or more candidate projections in the set of candidate projections satisfy an override.

23. The method of claim 22 wherein the override specifies a sort order, an encoding, or segmentation properties of a candidate projection.

24. The method of claim 22 wherein the override requires that column sort orders for a table in the set of tables begin with a specific column, the method further comprising eliminating column sort orders for the table that do not begin with the specific column.

25. The method of claim 22 wherein the override requires that column sort orders for a table in the set of tables have one or more columns with respective encodings, the method further comprising eliminating column sort orders for the table that do not have the one or more columns with the respective encodings.

26. The method of claim 22 wherein the override requires that column sort orders for a table in the set of tables be segmented by a column of the table, the method further comprising eliminating extended column sort orders for the table that are not segmented on the column.

27. The method of claim 20 wherein generating seeds and extenders further comprises:
if the column is a predicate column and a number of run-length encoding buckets defined by sorting and run-length encoding the column does not exceed a threshold, generating a seed equal to the column and an extender equal to the column.

28. The method of claim 20 wherein generating seeds and extenders further comprises: if the column is in a set of group-by columns for a query in the set of queries, generating a seed equal to the set of group-by columns.

29. The method of claim 20 wherein generating seeds and extenders further comprises: if the column is in a set of group-by columns and a number of run-length encoding buckets defined by sorting and run-length encoding the column does not exceed a threshold, generating an extender equal to the set of group-by columns.

30. The method of claim 20 wherein creating column sort orders from the seeds and extenders further comprises applying the extenders to the seeds and to results of applying the extenders to the seeds until no additional column sort orders can be generated.

31. The method of claim 1, further comprising for each of one or more of the remaining candidate projections that are not segmented, segmenting the candidate projection on one or more primary key columns of a table corresponding to the candidate projection or segmenting the candidate projection on a column that has a highest number of distinct values.

32. The method of claim 1, further comprising for each of one or more of the remaining candidate projections that are not segmented, if there is a functional dependency between a first column and a second column in the candidate projection, specifying that the candidate projection is sorted and run-length encoded on the first and second columns.

33. The method of claim 1, further comprising for each of one or more of the remaining candidate projections that are not segmented, performing one or more encoding experiments to determine an encoding scheme that yields optimal storage compression.

34. The method of claim 1 wherein creating the set of candidate projections and narrowing the set of candidate projections is performed by a relational database management system (RDBMS).

35. The method of claim 34 wherein the RDBMS is a row-oriented database, a column-oriented database, or a hybrid row and column-oriented database.

36. A computer program product, encoded on a computer-readable storage device, operable to cause data processing apparatus to perform operations comprising:
creating a set of candidate projections each being based on a column sort order in a set of column sort orders and being associated with properties of one or more tables in a set of tables to which the column sort order applies, wherein a column sort order is a sequence of one or more columns, each column's data being stored in an order; and
until a stopping condition is reached, progressively narrowing the set of candidate projections and a set of queries by eliminating candidate projections that do not satisfy a performance improvement criterion for remaining queries based on the properties associated with the candidate projections;

wherein narrowing queries comprises:

generating an execution plan for each of one or more remaining queries in the set of queries wherein each execution plan is based on one or more of the remaining candidate projections;

determining a difference in a level of optimization of each execution plan between the execution plan as optimized by the set of candidate projections before a most recent narrowing of the set of candidate projections and the execution plan as optimized after the most recent narrowing of the set of candidate projections;

determining for each query whether the query is sufficiently optimized based on the determined difference in the level of optimization; and eliminating queries from the set of queries that are sufficiently optimized.

37. A system comprising:

a sort order generator configured to create a set of column sort orders derived from a set of queries, wherein a column sort order is a sequence of one or more columns, each column's data being stored in an order;

a projection generator configured to create a set of candidate projections, each being based on a column sort order in the set of column sort orders and being associated with properties of one or more tables in a set of tables to which the column sort order applies; and a candidate projection filter configured to filter one or more candidate projections from the set of candidate projections that do not satisfy a performance improvement criterion for the set of queries;

a query filter configured to filter one or more queries from the set of queries that are sufficiently optimized by candidate projections in the set of candidate projections;

wherein filtering queries comprises:

generating an execution plan for each of one or more remaining queries in the set of queries wherein each execution plan is based on one or more of the remaining candidate projections;

determining a difference in a level of optimization of each execution plan between the execution plan as optimized by the set of candidate projections before the most recent filtering of the set of candidate projections and the execution plan as optimized after the most recent filtering of the set of candidate projections;

determining for each query whether the query is sufficiently optimized based on the determined difference in the level of optimization; and eliminating queries from the set of queries that are sufficiently optimized.

38. The system of claim 37 further comprising:

a table filter configured to filter one or more tables from the set of tables that have a number of candidate projections in the set of candidate projections that has reached a target number of projections.

* * * * *